United States Patent
Saggar et al.

(10) Patent No.: US 12,439,433 B2
(45) Date of Patent: Oct. 7, 2025

(54) COORDINATED SIDELINK AIR INTERFACE RESOURCE SELECTION FOR FULL-DUPLEX COMMUNICATIONS

(71) Applicant: QUALCOMM Incorporated, San Diego, CA (US)

(72) Inventors: Hemant Saggar, San Diego, CA (US); Yan Zhou, San Diego, CA (US); Tao Luo, San Diego, CA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/185,856

(22) Filed: Mar. 17, 2023

(65) Prior Publication Data

US 2024/0313934 A1  Sep. 19, 2024

(51) Int. Cl.
*H04L 5/00* (2006.01)
*H04L 5/14* (2006.01)
*H04W 8/22* (2009.01)
*H04W 24/10* (2009.01)
*H04W 72/02* (2009.01)
(Continued)

(52) U.S. Cl.
CPC ........... *H04W 72/40* (2023.01); *H04L 5/0037* (2013.01); *H04L 5/14* (2013.01); *H04W 8/22* (2013.01); *H04W 24/10* (2013.01); *H04W 72/02* (2013.01); *H04W 72/0446* (2013.01); *H04W 72/0453* (2013.01); *H04W 72/046* (2013.01); *H04W 72/25* (2023.01); *H04W 76/14* (2018.02); *H04W 76/23* (2018.02); *H04W 84/02* (2013.01); *H04W 88/02* (2013.01); *H04W 92/18* (2013.01)

(58) Field of Classification Search
CPC .... H04B 7/02–12; H04B 17/0082–409; H04L 5/0001–26; H04W 8/22–245; H04W 16/02–32; H04W 24/02–10; H04W 28/02–26; H04W 48/02–20; H04W 72/02–569; H04W 76/10–50; H04W 84/005–22; H04W 88/02–16; H04W 92/16–18
See application file for complete search history.

(56) References Cited

U.S. PATENT DOCUMENTS

2023/0081233 A1* 3/2023 Zhang ................... H04W 72/40
2023/0156785 A1* 5/2023 Yao ........................ H04W 72/40
(Continued)

*Primary Examiner* — Timothy J Weidner
(74) *Attorney, Agent, or Firm* — Guang Y. Zhang; Harrity & Harrity, LLP

(57) ABSTRACT

Various aspects of the present disclosure generally relate to wireless communication. In some aspects, a first user equipment (UE) may transmit, based at least in part on using a sidelink with a second UE, a first indication of a first availability state associated with a sidelink air interface resource and detected by the first UE. The first UE may receive, based at least in part on using the sidelink, a second indication of a second availability state associated with the sidelink air interface resource, the second availability state not generated by the first UE. The first UE may select a duplex communication configuration based at least in part on the first availability state and the second availability state. The first UE may communicate with the second UE using the sidelink air interface resource based at least in part on the duplex communication configuration. Numerous other aspects are described.

30 Claims, 9 Drawing Sheets

(51) Int. Cl.
  *H04W 72/044* (2023.01)
  *H04W 72/0446* (2023.01)
  *H04W 72/0453* (2023.01)
  *H04W 72/25* (2023.01)
  *H04W 72/40* (2023.01)
  *H04W 76/14* (2018.01)
  *H04W 76/23* (2018.01)
  *H04W 84/02* (2009.01)
  *H04W 88/02* (2009.01)
  *H04W 92/18* (2009.01)

(56) References Cited

U.S. PATENT DOCUMENTS

2024/0292374 A1* 8/2024 Zhou .................... H04W 72/40
2024/0292378 A1* 8/2024 Khoryaev ............. H04W 72/40

* cited by examiner

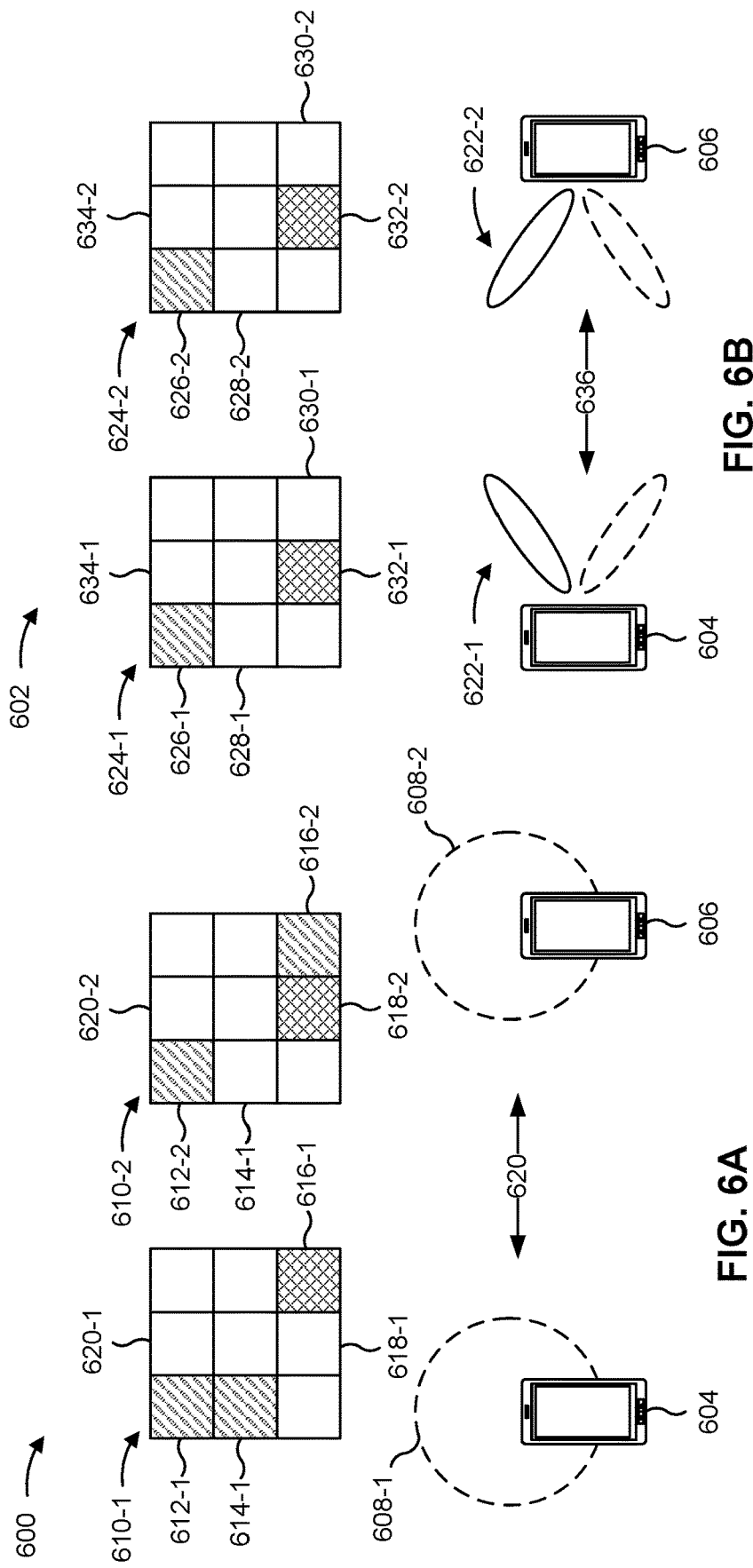
FIG. 6A
FIG. 6B
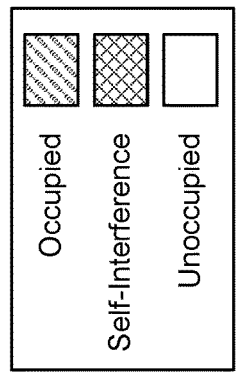

COORDINATED SIDELINK AIR INTERFACE RESOURCE SELECTION FOR FULL-DUPLEX COMMUNICATIONS

FIELD OF THE DISCLOSURE

Aspects of the present disclosure generally relate to wireless communication and to techniques and apparatuses for coordinated sidelink air interface resource selection for full-duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, based at least in part on using a sidelink with a second UE, a first indication of a first availability state associated with a sidelink air interface resource, the first availability state being detected by the first UE. The method may include receiving, based at least in part on using the sidelink with the second UE, a second indication of a second availability state associated with the sidelink air interface resource, the second availability state not generated by the first UE. The method may include selecting a duplex communication configuration based at least in part on the first availability state and the second availability state. The method may include communicating with the second UE using the sidelink and the sidelink air interface resource based at least in part on the duplex communication configuration.

Some aspects described herein relate to an apparatus for wireless communication at a first UE. The apparatus may include a memory and one or more processors coupled to the memory. The one or more processors may be configured to cause the UE to transmit, based at least in part on using a sidelink with a second UE, a first indication of a first availability state associated with a sidelink air interface resource, the first availability state being detected by the first UE. The one or more processors may be configured to cause the UE to receive, based at least in part on using the sidelink with the second UE, a second indication of a second availability state associated with the sidelink air interface resource, the second availability state not generated by the first UE. The one or more processors may be configured to cause the UE to select a duplex communication configuration based at least in part on the first availability state and the second availability state. The one or more processors may be configured to cause the UE to communicate with the second UE using the sidelink and the sidelink air interface resource based at least in part on the duplex communication configuration.

Some aspects described herein relate to a non-transitory computer-readable medium that stores a set of instructions for wireless communication by a first UE. The set of instructions, when executed by one or more processors of the UE, may cause the UE to transmit, based at least in part on using a sidelink with a second UE, a first indication of a first availability state associated with a sidelink air interface resource, the first availability state being detected by the first UE. The set of instructions, when executed by one or more processors of the UE, may cause the UE to receive, based at least in part on using the sidelink with the second UE, a second indication of a second availability state associated with the sidelink air interface resource, the second availability state not generated by the first UE. The set of instructions, when executed by one or more processors of the UE, may cause the UE to select a duplex communication configuration based at least in part on the first availability state and the second availability state. The set of instructions, when executed by one or more processors of the UE, may cause the UE to communicate with the second UE using the sidelink and the sidelink air interface resource based at least in part on the duplex communication configuration.

Some aspects described herein relate to an apparatus for wireless communication at a first UE. The apparatus may include means for transmitting, based at least in part on using a sidelink with a second UE, a first indication of a first availability state associated with a sidelink air interface resource, the first availability state being detected by the first UE. The apparatus may include means for receiving, based at least in part on using the sidelink with the second UE, a second indication of a second availability state associated with the sidelink air interface resource, the second availability state not generated by the first UE. The apparatus may include means for selecting a duplex communication configuration based at least in part on the first availability state and the second availability state. The apparatus may include means for communicating with the second UE using the sidelink and the sidelink air interface resource based at least in part on the duplex communication configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B are diagrams illustrating a first example and a second example, respectively, of coordinated resource sensing, in accordance with the present disclosure.

DETAILED DESCRIPTION

Figure 1:
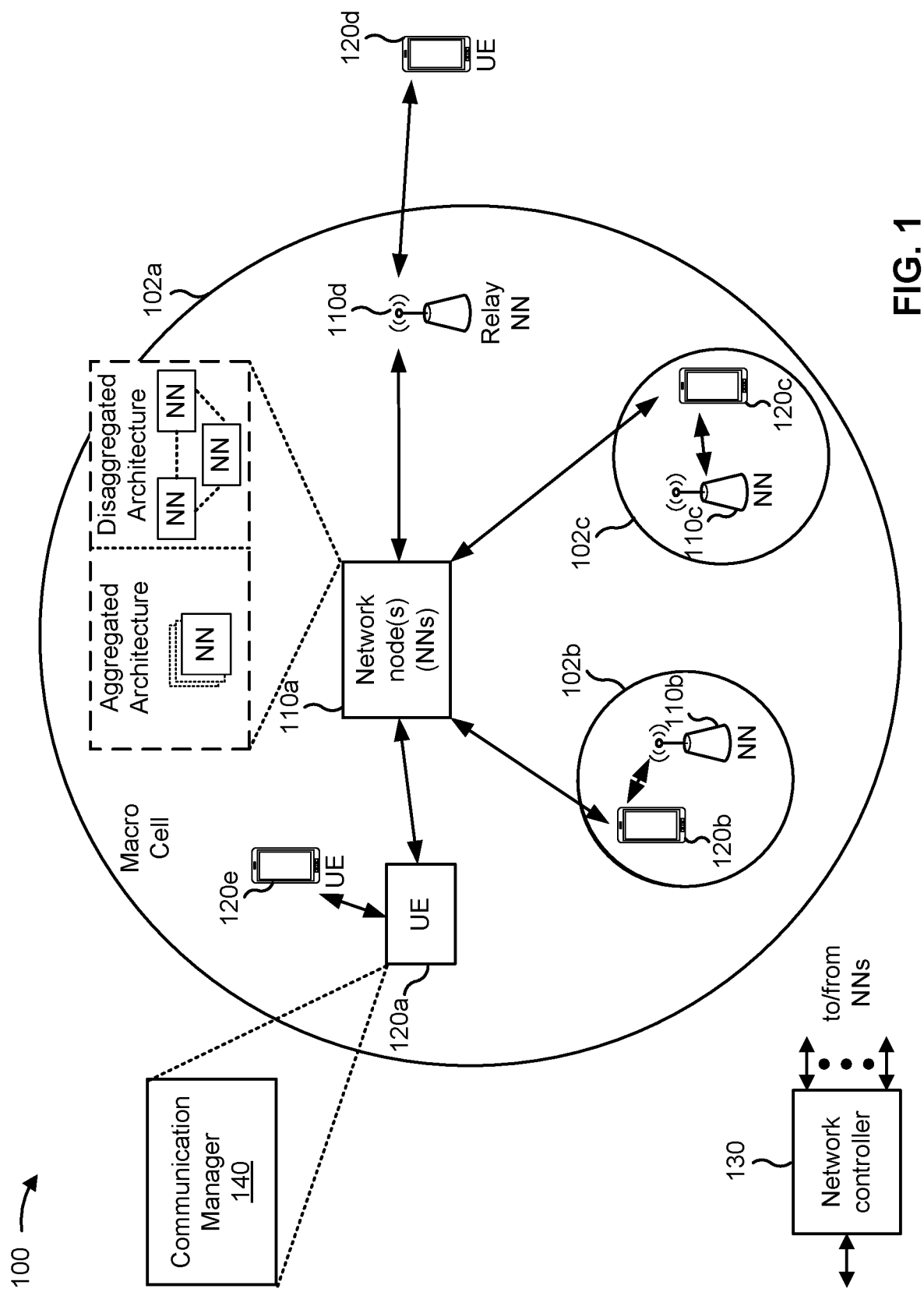
FIG. 1 is a diagram illustrating an example of a wireless network, in accordance with the present disclosure.

For half-duplex (HD) sidelink communications, a first (transmitting) user equipment (UE) may identify an unoccupied sidelink air interface resource without feedback from a second (receiving) UE based on a resource sensing and identification procedure. However, using a resource sensing and identification procedure that lacks sensing feedback between the UEs may result in high interference and/or degraded sidelink performance (e.g., increased recovery errors, reduced data throughput, and/or increased data transfer latencies) when used to find sidelink air interface resources for one or more full-duplex (FD) sidelink communications. Accordingly, without feedback from the second UE, the first UE may begin FD sidelink communications in the sidelink air interface resource, which may result in degraded signal quality (e.g., increased interference and/or increased distortion) and/or degraded sidelink performance at the second UE.

Alternatively, or additionally, the first UE may utilize a first beam for sensing resources (e.g., as part of the resource sensing and identification procedure), and the second UE may utilize a second, different beam for sensing resources (e.g., as part of a respective resource sensing and identification procedure). Based at least in part on using different beams for resource sensing, each UE may identify different available resources for full-duplex (FD) sidelink communication. However, without prior beam coordination between the two UEs, the first beam and the second beam may be sub-optimal for FD sidelink communications (e.g., fails to mitigate self-interference), resulting in degraded sidelink performance. Using an optimal FD beam pair (e.g., a beam pair that mitigates self-interference better than other beam pairs) for resource sensing may lead to degraded performance when the optimal FD beam pair is used to establish half-duplex (HD) communications.

Various aspects described herein provide coordinated sidelink air interface resource selection for FD communications. In some aspects, a first UE may transmit, based at least in part on using a sidelink with a second UE, a first indication of a first availability state associated with a sidelink air interface resource, and receive a second indication of a second availability state that is associated with the sidelink air interface resource. The first UE may select, based at least in part on the first availability state and the second availability state, a duplex communication configuration for communicating with the second UE using the sidelink and the sidelink air interface resource. To illustrate, the first UE may select, as the duplex communication configuration, any combination of a duplexing mode, a transmit beam, and/or one or more beams.

By sharing resource sensing results with a second UE, a first UE may perform joint and/or coordinated resource sensing to identify sidelink air interface resource(s) that the first UE and the second UE both observe as being unoccupied (e.g., a common availability resource). In some aspects, the first UE and/or the second UE may transmit and/or receive FD sidelink communications based at least in part on using a common availability resource that each UE observes as being unoccupied, which results in improved signal quality (e.g., decreased interference and/or decreased distortion) and/or improved sidelink performance (e.g., fewer recovery errors, increased data throughput, and/or decreased data transfer latencies) relative to resource selection without feedback.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band. In some aspects, FR2 may include multiple frequency ranges. To illustrate, FR2-1 may refer to a first frequency range that includes 24.25 GHZ-52.6 GHz, and FR2-2 may refer to a second frequency range (e.g., an extended FR2) that includes 52.6 GHz--71 GHZ.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 71 GHz. For example, three higher operating bands have been identified as frequency range designations FR4 (71 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, and/or FR5, or may be within the EHF band. It is contemplated that the frequencies included in these operating bands (e.g., FR1, FR2, FR3, FR4, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit, based at least in part on using a sidelink with a second UE, a first indication of a first availability state associated with a sidelink air interface resource, the first availability state being detected by the first UE; receive, based at least in part on using the sidelink with the second UE, a second indication of a second availability state associated with the sidelink air interface resource, the second availability state not generated by the first UE; select a duplex communication configuration based at least in part on the first availability state and the second availability state; and communicate with the second UE using the sidelink and the sidelink air interface resource based at least in part on the duplex communication configuration. Additionally, or alternatively, the communication manager 140 may perform one or more other operations described herein.

As indicated above, FIG. 1 is provided as an example. Other examples may differ from what is described with regard to FIG. 1.

Figure 2:
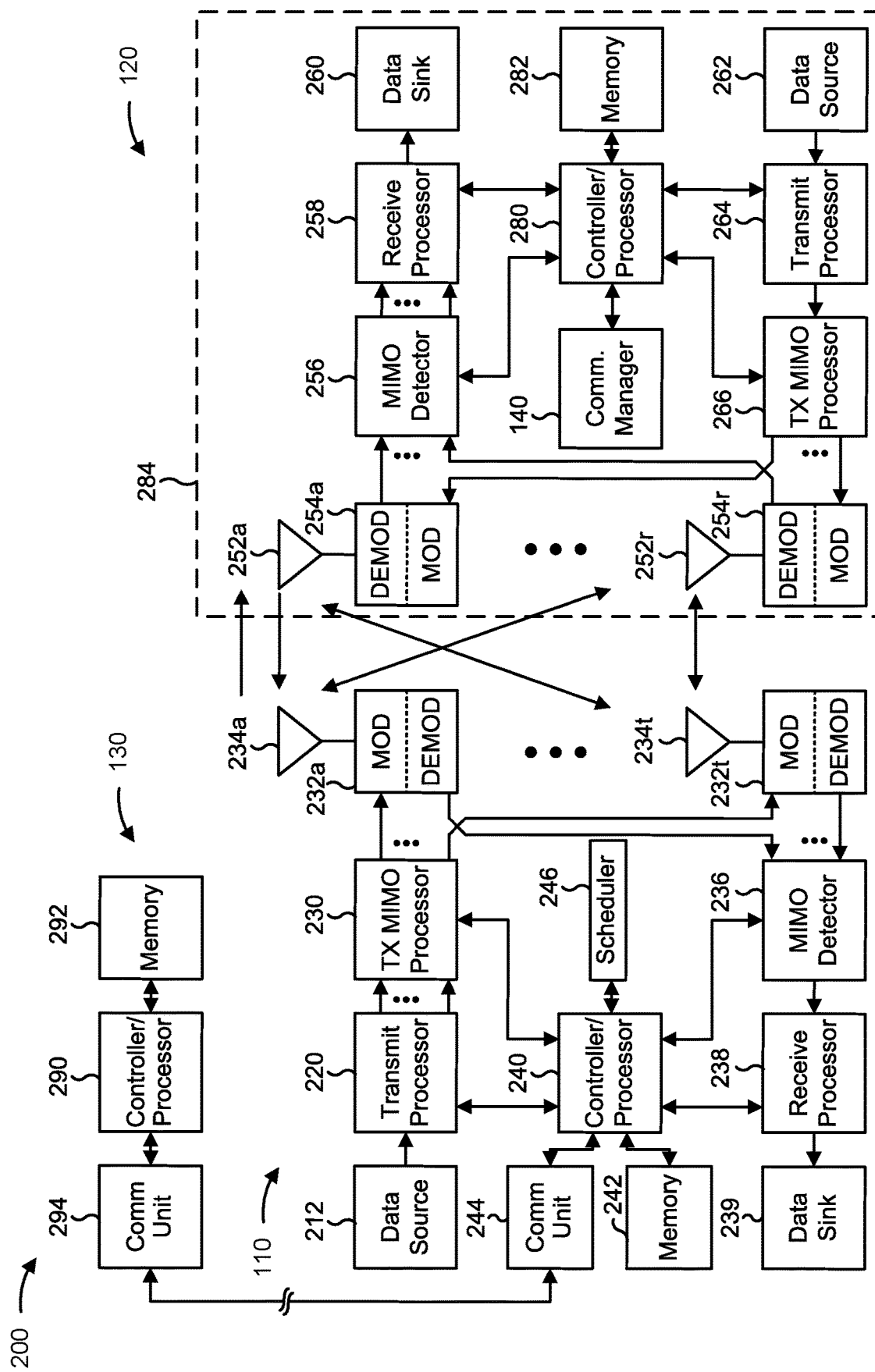
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with coordinated sidelink air interface resource selection for FD communications, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, a first UE (e.g., a UE 120) includes means for transmitting, based at least in part on using a sidelink with a second UE, a first indication of a first availability state associated with a sidelink air interface resource, the first availability state being detected by the first UE; means for receiving, based at least in part on using the sidelink with the second UE, a second indication of a second availability state associated with the sidelink air interface resource, the second availability state not generated by the first UE; means for selecting a duplex communication configuration based at least in part on the first availability state and the second availability state; and/or means for communicating with the second UE using the sidelink and the sidelink air interface resource based at least in part on the duplex communication configuration. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
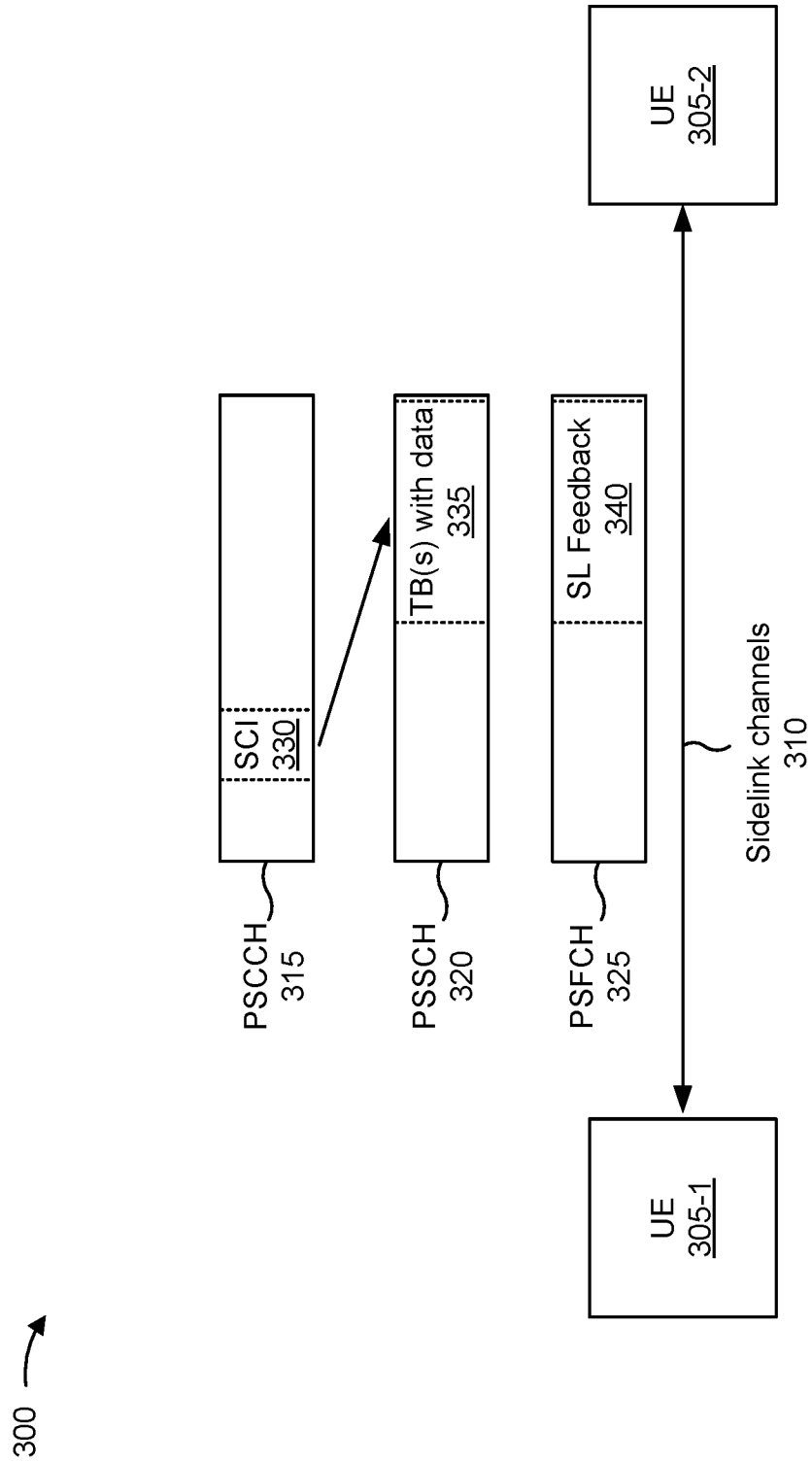
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
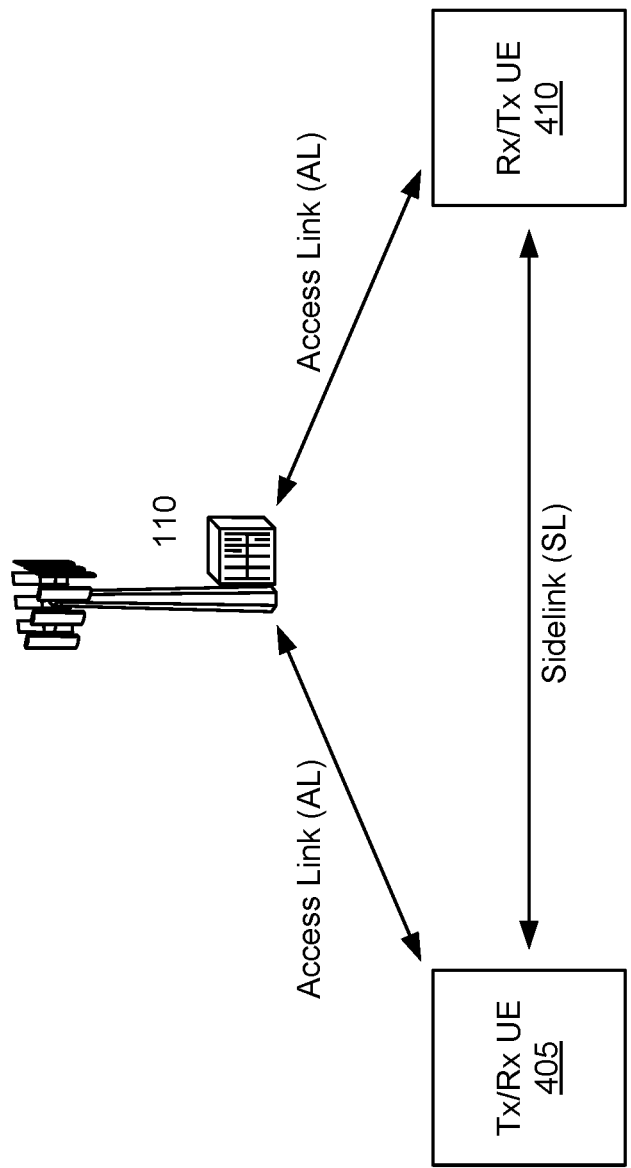
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
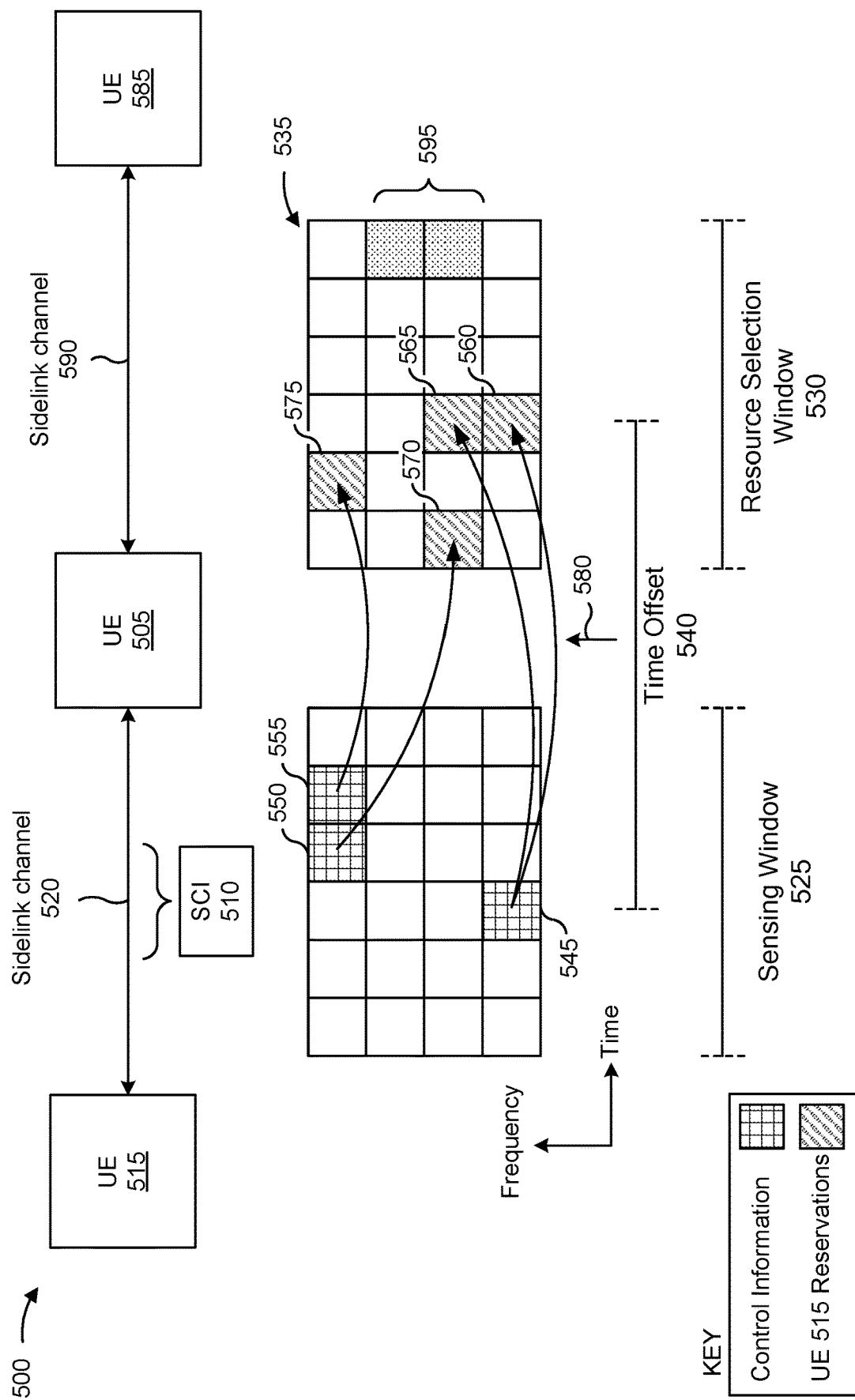
FIG. 5 is a diagram illustrating an example of a resource sensing and/or a resource reserving procedure, in accordance with the present disclosure.

FIG. 5 is a diagram illustrating an example 500 of a resource sensing and/or a resource reserving procedure, in accordance with the present disclosure. As shown in FIG. 5, a UE (e.g., a UE 120) may use the resource sensing procedure to select resources from a resource window for sidelink communication. For example, the UE (e.g., rather than a base station) may select resources for sidelink communication based at least in part on operating in a Mode 2 transmission mode, as further described with regard to FIG. 3.

In some aspects, the UE may perform resource selection and/or scheduling by sensing channel availability for transmissions and/or based at least in part on resource reservation information associated with one or more other UEs. To illustrate, a first UE 505 may receive sidelink control information 510 (SCI 510) from a second UE 515 over a first sidelink channel 520, where the SCI 510 may indicate resource reservation information (e.g., one or more reserved resources, preferred resources, and/or non-preferred resources) associated with the second UE 515. The first UE 505 may analyze the resource reservation information based at least in part on a sensing window 525, a resource selection window 530, and/or a signal metric (e.g., RSRP. RSSI, or RSRQ). While the example 500 shows the first UE 505 receiving resource reservation information from a single UE (e.g., the second UE 515), alternate examples may include the first UE 505 receiving resource reservation information from multiple UEs.

The resource selection window 530 may include a resource pool 535 of M resources that are based at least in part on frequency and time partitions (e.g., sub-channel frequency partitions and/or time slot time partitions) for future sidelink transmissions. M denotes an integer and may be based at least in part on a size (e.g., time duration and/or frequency span) of the resource selection window 530. In some aspects, the sensing window 525 and the resource selection window may be separated by a time offset 540 known to the first UE 505. As one example, the first UE 505 may receive, from a base station, configuration information that indicates a configuration of the sensing window 525, the resource selection window 530, and/or the time offset 540. As another example, the first UE 505 may be pre-configured with the configuration information of the sensing window 525, the resource selection window 530, and/or the time offset 540. Examples of pre-configured configuration information may include configuration information that is stored in memory of the first UE 505 and/or configuration information that the first UE 505 reads from a file.

In some aspects, and as part of the resource sensing procedure, the first UE 505 may receive and decode the SCI 510 to obtain the resource reservation information associated with the second UE 515. As one example, the second UE 515 may transmit a first portion of the SCI 510 using a first sensing window resource 545, a second portion of the SCI 510 using a second sensing window resource 550, and/or a third portion of the SCI 510 using a third sensing window resource 555. The first UE 505 may receive the SCI 510 based at least in part on receiving the first sensing window resource 545, the second sensing window resource 550, and/or the third sensing window resource 555. The first UE 505 may decode the SCI 510 received using the first sensing window resource 545, the second sensing window resource 550, and/or the third sensing window resource 555 to obtain the resource reservation information associated with the second UE 515. To illustrate, the first portion of SCI 510 transmitted using the first sensing window resource 545 may indicate that the second UE 515 has reserved a first resource selection window resource 560 and a second resource selection window resource 565. A second portion of the SCI 510 transmitted using the second sensing window resource 550 may indicate that the second UE 515 has reserved a third resource selection window resource 570. A third portion of the SCI 510 transmitted using the third sensing window resource 555 may indicate that the second UE 515 has reserved a fourth resource selection window resource 575. In some aspects, the first UE 505 may identify the first resource selection window resource 560, the second resource selection window resource 565, the third resource selection window resource 570, and/or the fourth resource selection window resource 575 based at least in part on an index value indicated by the SCI 510 and/or the time offset 540.

As part of the resource sensing procedure, the first UE 505 may perform one or more measurements and/or generate one or more metrics (e.g., RSRP, RSSI, and/or RSRQ) based at least in part on a sidelink channel and/or one or more resources associated with the sidelink channel. For instance, the first UE 505 may perform a measurement and/or generate a metric based at least in part on a resource in the sensing window 525, such as the first sensing window resource 545.

In some aspects, the first UE 505 may associate the measurement result generated based at least in part on a sensing window resource with a resource selection window resource. To illustrate, the first UE 505 may associate the measurement result generated based at least in part on the first sensing window resource 545 with the resource selection window resource 560 based at least in part on the time offset 540. The first UE 505 may identify available and/or unavailable resources in the resource selection window 530 based at least in part on the measurement result and the association. For example, the measurement result may provide an indication of resources in the resource selection window that are occupied and/or may have high interference. In some examples, the UE may compare the measurement result to a threshold, such as an RSRP threshold. The UE may determine that a resource associated with a measurement result that fails to satisfy the threshold (e.g., has an RSRP value above the threshold) is occupied. Accordingly, the UE may exclude a resource identified as being occupied from selection. Alternatively or additionally, the UE may exclude from selection a resource that another UE has indicated is reserved (e.g., using the SCI).

As shown in FIG. 5, the first UE 505 may initiate the resource selection procedure and/or select a resource to reserve based at least in part on a resource selection trigger 580. For example, the first UE 505 may trigger the resource selection procedure based at least in part on the first UE 505 having data and/or information to transmit to a third UE 585 over a sidelink channel 590. In some aspects, and based at least in part on the resource selection trigger 580, the first UE 505 may initiate the resource selection procedure to select and/or reserve one or more resources from the resource selection window 530, such as the resources shown by reference number 595, for transmitting the data and/or information to the third UE 585.

"Half-duplex communication" (HD communication) in a wireless network refers to unidirectional communications (e.g., only downlink communication, only uplink communication, and/or a unidirectional sidelink communication) between devices at a given time (e.g., in a given slot or a given symbol). To illustrate, a first UE and a second UE may each operate in an HD communication mode and, subsequently, communicate with one another using a sidelink in a serial manner. For example, the first UE may transmit a first sidelink communication to the second UE using the sidelink during a first time span, and the second UE may transmit a second sidelink communication to the first UE during a second, different time span such that the first sidelink communication and the second sidelink communication do not overlap in the time domain.

The two UEs may communicate with one another via the sidelink based at least in part on using one or more directional HD beams, such as by configuring an antenna array to perform beamforming transmission and/or reception. As one example, the first UE may select a first HD transmit beam for transmitting a first HD sidelink communication to the second UE using the sidelink, and a second UE may select a first HD receive beam for receiving the first HD sidelink communication. Alternatively, or additionally, the second UE may select a second HD transmit beam for transmitting a second HD sidelink communication, and the first UE may select a second HD receive beam for receiving the second HD sidelink communication. Accordingly, "half-duplex beam pair" (e.g., an HD beam pair) may denote a transmit beam used by a first device and a receive beam used by a second device to transmit and receive a communication, respectively.

"Full-duplex communication" (FD communication) in a wireless network refers to simultaneous bi-directional communication between devices in the wireless network. To illustrate, the first UE and the second UE may operate in an FD communication mode such that the first UE transmits a first FD sidelink communication to the second UE during a same time span (e.g., in a same time slot and/or in a same symbol) that the first UE receives a second FD sidelink communication from the second UE. That is, the first FD sidelink communication and the second FD sidelink communication may partially and/or fully overlap in the time domain, but may also partially and/or fully overlap in the frequency domain. To illustrate, a UE may transmit and receive FD communications based at least in part on including multiple antenna panels and/or an ability to configure a single antenna panel into multiple antenna groups such that a first antenna panel and/or first antenna group is configured to transmit a first FD communication and a second antenna panel and/or second antenna group is configured to receive a second FD communication. The UE may alternatively or additionally have isolation hardware to isolate transmitter chain hardware from receiver chain hardware.

In some aspects, the two UEs may use a different combination of beams for FD communications relative to the HD beam pair(s). For instance, the first UE and the second UE may select, for each HD sidelink connection and/or HD beam pair, a transmit beam and a receive beam that improve a performance of the sidelink (e.g., reduce recovery errors, reduce data transfer latencies, and/or increase bandwidth), such as by selecting an HD beam pair that results in a higher signal-to-noise ratio (SNR) relative to other transmit beam and receive beam pairs. However, for an FD sidelink connection, the first UE and/or the second UE may select different beams than the HD beam pair(s) based at least in part on reducing self-interference at the respective UE. That is, the UEs may select one or more FD beam pairs that include different beams than an HD beam pair by using different selection criteria (e.g., self-interference reduction versus high SNR). "Full-duplex beam pair" (FD beam pair) may denote an FD transmit beam and an FD receive beam used by a device for FD communications (e.g., FD sidelink communications). Accordingly, an FD beam pair may be used at a device to transmit a first communication and receive a second communication based at least in part on the device operating in an FD mode.

Because HD sidelink communications are performed serially, a transmitting UE may identify an unoccupied resource without feedback from a receiving UE. That is, based at least in part on the serial nature of HD sidelink communications, the transmitting UE may perform a resource sensing procedure, identify an unoccupied resource, and/or transmit an HD sidelink communication using the unoccupied resource without receiving input from the receiving UE. However, using a resource sensing procedure that lacks sensing feedback between UEs may result in high interference and/or degraded sidelink performance (e.g., increased recovery errors, reduced data throughput, and/or increased data transfer latencies) when used to find sidelink air interface resources for one or more FD sidelink communications. As one example, a first UE and a second UE may each perform resource sensing based at least in part on using HD beams (e.g., a respective HD transmit beam and/or a respective HD receive beam) and/or FD beams. Because each UE may use different sensing beams, the first UE may sense a sidelink air interface resource as being unoccupied that a second UE senses as being occupied. Without feedback from the second UE, the first UE may begin FD sidelink communications in the sidelink air interface resource, which may result in degraded signal quality (e.g., increased interference and/or increased distortion) and/or degraded sidelink performance at the second UE.

Alternatively or additionally, performing resource sensing using an HD beam may result in a UE observing an availability state (e.g., unoccupied) for a sidelink air interface resource that is different (e.g., occupied or self-interference) from when performing FD sidelink communications using an FD beam pair. To illustrate, an HD receive beam used by the UE for resource sensing may have a different spatial width and/or propagation direction relative to an FD receive beam in an FD beam pair that is used by the UE for FD sidelink communications. Accordingly, the UE may sense that a sidelink air interface resource is unoccupied using a resource sensing procedure and the HD beam, but observe self-interference and/or distortion when transmitting and/or receiving FD sidelink communications via the FD beam pair. The observed self-interference and/or distortion may also result in degraded signal quality and/or degraded sidelink performance.

Some techniques and apparatuses described herein provide coordinated sidelink air interface resource selection for FD communications. In some aspects, a first UE may transmit, based at least in part on using a sidelink with a second UE, a first indication of a first availability state associated with a sidelink air interface resource. The first UE may detect the first availability state based at least in part on a sidelink resource sensing procedure. The first UE may receive, based at least in part on using the sidelink with the second UE, a second indication of a second availability state associated with the sidelink air interface resource. In various aspects, the second availability state is not generated by the first UE. For example, the second UE may generate the second availability state based at least in part on performing a respective sidelink resource sensing procedure. Accordingly, the second UE may transmit the indication of the second availability state to the first UE. In some aspects, the first UE may select a duplex communication configuration based at least in part on the first availability state and the second availability state. To illustrate, the first UE may determine, as the duplex communication configuration, a duplexing mode (e.g., an HD communication mode and/or an FD communication mode) and/or one or more beams (e.g., one or more HD beams and/or an FD beam pair) for using the sidelink air interface resource to communicate with the second UE via the sidelink. In some aspects, the first UE may determine the duplexing communication configuration for using the sidelink air interface resource based at least in part on whether the first UE identifies the sidelink air interface resource as having a common availability, a non-common availability, and/or being unavailable as further described with regard to FIGS. 6A, 6B, and/or 7. Accordingly, the first UE may communicate with the second UE using the sidelink and the sidelink air interface resource based at least in part on the duplex communication configuration, such as by transmitting and/or receiving an HD sidelink communication using the sidelink air interface resource or transmitting and/or receiving an FD sidelink communication using the sidelink air interface resource.

By sharing resource sensing results with a second UE, a first UE may perform joint and/or coordinated resource sensing to identify sidelink air interface resource(s) that the first UE and the second UE both observe as being unoccupied (e.g., a common availability resource). "Coordinated resource sensing," alternatively referred to as joint resource sensing, may denote determining a shared state of an air interface resource based at least in part on sidelink resource sensing results from at least two different devices, such as a first shared state that indicates that both devices observe the air interface resource as having a same availability state (e.g., unoccupied) and/or a second shared state that indicates that the devices observe different availability states. To illustrate, and as described below with regard to FIGS. 6A, 6B, and/or 7, a first sidelink air interface resource that the first UE and the second UE both observe as being unoccupied may have a first shared state that is referred to as a "common availability resource", and a second air interface resource that the first UE and the second UE both observe differently (e.g., one UE observes the second air interface resource as being occupied and the other UE observes the second air interface resource as being unoccupied) may have a second shared state referred to as a "non-common availability resource". A third air interface resource that the first UE and the second U both observe as being occupied may have a third shared state referred to as an "unavailable resource." In some aspects, the first UE and/or the second UE may transmit and/or receive FD sidelink communications based at least in part on using a common availability resource that each UE observes as being unoccupied, which results in improved signal quality (e.g., decreased interference and/or decreased distortion) and/or improved sidelink performance (e.g., fewer recovery errors, increased data throughput, and/or decreased data transfer latencies) relative to resource selection without feedback.

As indicated above, FIG. 5 is provided as an example. Other examples may differ from what is described with respect to FIG. 5.

FIGS. 6A and 6B are diagrams illustrating a first example 600 and a second example 602, respectively, of coordinated resource sensing, in accordance with the present disclosure. The first example 600 shown by FIG. 6A and the second example 602 shown by FIG. 6B include a first UE 604 (e.g., a UE 120) and a second UE 606 (e.g., another UE 120) that may communicate with one another using Mode 2 sidelink communications. In the first example 600 and the second example 602, the first UE 604 and the second UE 606 are each FD-capable devices and, in some aspects, may determine to establish a sidelink with one another based at least in part on each UE including FD capabilities. To illustrate, the first UE 604 and/or the second UE 606 may transmit UE capability information (e.g., in a broadcast message, a unicast message, and/or a multicast message) that indicates FD sidelink capability information. In some aspects, the first UE 604 and/or the second UE 606 may prioritize connecting with an FD-capable device, and establish a sidelink with one another. The first UE 604 and the second UE 606 may initially establish the sidelink based at least in part on transmitting and/or receiving HD sidelink communications using one or more HD beam pairs as described above. Based at least in part on establishing the sidelink, the first UE 604 and/or the second UE 606 may perform coordinated resource sensing as described herein.

In the first example 600 shown by FIG. 6A, the first UE 604 and/or the second UE 606 may perform resource sensing based at least in part on an omnidirectional beam (shown as omnidirectional beam 608-1 and omnidirectional beam 608-2, respectively). For example, the first UE 604 and/or the second UE 606 may configure an antenna panel and/or antenna array as an omnidirectional receiver that receives signals in all directions equally and/or commensurately (e.g., within a range of values of one another and/or within a threshold of one another). Accordingly, an omnidirectional receiver may be configured to receive signals in all directions equally, but real-world implementations may deviate from the received signals being exactly equal. That is, an omnidirectional beam may be based at least in part on a spherical propagation and/or radiation pattern, and real-world implementations may deviate from a perfectly spherical pattern.

The use of an omnidirectional beam as a sensing beam for sensing sidelink resource availability may result in the first UE 604 and/or the second UE 606 finding different available resources relative to using an FD beam pair for sensing sidelink resource availability based at least in part on the omnidirectional receiver observing more signal presence in a resource and/or based at least in part on the omnidirectional receiver failing to observe weaker signals based at least in part on having less beamforming gain (e.g., relative to sensing that is based at least in part on a directional beam). That is, the first UE 604 and/or the second UE 606 may observe a higher signal power level in a sidelink air interface resource using an omnidirectional beam relative to using an FD beam pair. Thus, the first UE 604 and/or the second UE 606 may refrain from selecting the sidelink air interface resource for a sidelink transmission and, subsequently, provide protection to other transmissions that may be susceptible to interference and/or distortion based at least in part on a signal occupying the sidelink air interface resource.

In some aspects, a first propagation path (e.g., characterized based at least in part on a spatial width, a spatial size, and/or a direction) associated with an HD beam and/or an FD beam may lie inside a second propagation path associated with an omnidirectional beam. Accordingly, a UE (e.g., the first UE 604 and/or the second UE 606) may use a narrow beam (e.g., an HD beam and/or an FD beam) for transmitting and/or receiving a sidelink communication (e.g., an HD sidelink communication and/or an FD sidelink communication) using an unoccupied sidelink air interface resource. That is, the UE may use an omnidirectional beam for sensing an availability state of a sidelink air interface resource, and use a second, narrower beam (e.g., the HD beam and/or the FD beam pair) for communicating using the sidelink air interface resource based at least in part on the second, narrower beam being positioned and/or lying within the propagation path of the omnidirectional beam such that an availability state sensed using an omnidirectional beam is applicable to the second, narrower beam.

In some aspects, the first UE 604 may communicate sensing results to the second UE 606, and/or the second UE 606 may communicate sensing results to the first UE 604. To illustrate, the first example 600 includes a first resource sensing diagram 610-1 that is associated with resource sensing performed by the first UE 604 using the omnidirectional beam 608-1. The first example 600 also includes a second resource sensing diagram 610-2 that is associated with resource sensing performed by the second UE 606 using the omnidirectional beam 608-2. A horizontal axis of the first resource sensing diagram 610-1 and the second resource sensing diagram 610-2 represents time, and a vertical axis of the first resource sensing diagram 610-1 and the second resource sensing diagram 610-2 represents frequency. A time span associated with the first resource sensing diagram 610-1 and the second resource sensing diagram 610-2 may be divided into n time partitions, where n is an integer (shown as n=3). A frequency span associated with the first resource sensing diagram 610-1 and the second resource sensing diagram 610-2 may be divided into m frequency partitions, where m is an integer (shown as m=3). As described with regard to FIG. 5, a sidelink resource may be characterized based at least in part on a time partition and a frequency partition, and a UE may determine an availability of a future resource based at least in part on a sensing window. The first resource sensing diagram 610-1 represents a set of sidelink resources as observed by the first UE 604 (e.g., based at least in part on receiving a signal using the sidelink resource(s) in a sensing window), and the second resource sensing diagram 610-2 represents the (same) set of sidelink resources as observed by the second UE 606.

In the example 600, the first UE 604 senses (e.g., based at least in part on measurement metrics) that a first sidelink air interface resource 612-1 and a second sidelink air interface resource 614-1 may be busy and/or occupied (shown with a diagonal pattern), that a third sidelink air interface resource 616-1 may include and/or be susceptible to self-interference at the first UE 604 (shown with a crisscross pattern), and that a fourth sidelink air interface resource 618-1 and a fifth sidelink air interface resource 620-1 are clear and/or unoccupied (shown with a solid white pattern). Accordingly, the first UE 604 may generate a first resource sensing report that indicates an availability state (e.g., occupied, unoccupied, and/or self-interference) of one or more sidelink air interface resources based at least in part on resource sensing performed by the first UE 604. For instance, the first resource sensing report may indicate one or more sidelink air interface resources have an occupied availability state, one or more sidelink air interface resources have an unoccupied availability state, and/or one or more sidelink air interface resources have a self-interference availability state. As shown by reference number 620, the first UE 604 may transmit the first resource sensing report to the second UE

606, such as by transmitting the first resource sensing report in a PSCCH and/or a PSSCH.

Alternatively or additionally, the second UE 606 may generate a second resource sensing report and transmit the second resource sensing report to the first UE 604 (e.g., in the PSCCH and/or the PSSCH). To illustrate, the second sensing report may indicate that the second UE 606 observes, based at least in part on resource sensing performed using the omnidirectional beam 608-2, that a first sidelink air interface resource 612-2 may be occupied, that a second sidelink air interface resource 614-2 may be unoccupied, that a third sidelink air interface resource 616-1 may be occupied, that a fourth sidelink air interface resource 618-2 may include and/or be susceptible to self-interference at the second UE 606, and/or that a fifth sidelink air interface resource 620-2 may be clear and/or unoccupied. The second resource sensing report may indicate that one or more sidelink air interface resources have an occupied availability state, one or more sidelink air interface resources have an unoccupied availability state, and/or one or more sidelink air interface resources have a self-interference availability state.

The first UE 604 and the second UE 606 may analyze the respective resource sensing report from the other UE to identify one or more sidelink air interface resources (e.g., associated with a resource selection window, such as the resource selection window 530 as described with regard to FIG. 5) that both UEs identify as being unoccupied. Accordingly, "common availability resource" may refer to a sidelink air interface resource that each UE observes as being unoccupied, and "non-common availability resource" may refer to a sidelink air interface resource for which the UEs observe different availability states. In some aspects, the first UE 604 and/or the second UE 606 may identify a sidelink air interface resource as being an "unavailable resource". Accordingly, "unavailable resource" may refer to a shared state for a sidelink air interface resource in which both UEs observe as being occupied. To illustrate, in the example 600, the first UE 604 senses that the fifth sidelink air interface resource 620-1 is unoccupied, and the second UE 606 senses that the fifth sidelink air interface resource 620-2 is unoccupied. The first UE 604 and the second UE 606 may determine to transmit and/or receive FD sidelink communications with one another based at least in part on using a sidelink resource associated with the fifth sidelink air interface resource. That is, the first UE 604 and the second UE 606 may identify the fifth sidelink air interface resource as a common availability resource, and may transmit and/or receive FD sidelink communications with one another using the common availability resource. Alternatively or additionally, the first UE 604 and/or the second UE 606 may transmit and/or receive an HD sidelink communication in at least one non-common availability resource as described below with regard to FIG. 7.

One example of FD sidelink communications may include in-band full-duplex (IBFD) communications. "In-band full-duplex communication" may denote a first device (e.g., a UE and/or a network node) transmitting a first communication to a second device (e.g., a UE and/or network node) and receiving a second communication from the second device based at least in part on the same time resource (and/or a same portion of a time resource) and/or the same frequency resource (and/or a same portion of a frequency resource). As one example, a UE operating in an IBFD mode may transmit an uplink signal to a network node and receive a downlink signal from the network node (e.g., also operating in an FD communication mode) in a same time and frequency resource. As another example, a first UE operating in an IBFD mode may transmit a first sidelink signal to a second UE (e.g., also operating in the FD communication mode), and receive a second sidelink signal from the second UE in the same time and frequency resource. IBFD communication may include fully-overlapping time and frequency resources and/or partially-overlapping time and frequency resources. That is, the FD communications by the two devices may use the same time and frequency resource(s) in a fully-overlapping full-duplex mode (e.g., a fully-overlapping IBFD mode), and the FD communications by the two devices may use only some of the same time and frequency resources in a partially-overlapping full-duplex mode (e.g., a partially-overlapping IBFD mode). IBFD may also be referred to as "full band full duplex (FBFD)" and/or "single frequency full duplex (SFFD)."

Another example of FD sidelink communications may include sub-band full-duplex (SBFD) communication. "Sub-band full-duplex (SBFD) communication," which may also be referred to as "sub-band frequency division duplex (SBFDD)" or "flexible duplex," may denote a first device (e.g., a UE and/or a network node) transmitting a first communication to a second device (e.g., a UE and/or a network node) and receiving a second communication from the second device at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

In the second example 602 shown by FIG. 6B, the first UE 604 and/or the second UE 606 may perform resource sensing based at least in part on using one or more FD beam pairs (shown as FD beam pair 622-1 and FD beam pair 622-2, respectively) as sensing beam(s). Alternatively, or additionally, and as described with regard to FIG. 7, the first UE 604 and/or the second UE 606 may perform resource sensing using at least a portion of an FD beam pair (e.g., only an FD transmit beam, only and FD receive beam, and/or both the FD transmit beam and the FD receive beam) As one example, the first UE 604 (and/or the second UE 606) may configure a first antenna panel to perform beamforming and/or directional sensing based at least in part on a transmit beam and a second antenna panel to perform directional sensing based at least in part on a receive beam. As another example, the first UE 604 (and/or the second UE 606) may configure a first subset of antennas in a single antenna panel based at least in part on the first transmit beam and a second subset of antennas in the single antenna panel based at least in part on the receive beam. A directional antenna may be configured to transmit and/or receive a greater concentration of radiation in a particular spatial direction and/or a particular spatial width that is narrower than an omnidirectional beam. The use of a directional antenna for sensing sidelink resource availability may result in the first UE 604 and/or the second UE 606 finding different available and/or unoccupied resources (e.g., relative to using an omnidirectional antenna for sensing sidelink resource availability) based at least in part on the reduced sensing area and/or spatial width associated with using a directional antenna.

The second example 602 includes a first resource sensing diagram 624-1 that is associated with resource sensing performed by the first UE 604 using the first FD beam pair 622-1, and a second resource sensing diagram 624-2 that is associated with resource sensing performed by the second UE 606 using the FD beam pair 622-2. A horizontal axis of the first resource sensing diagram 624-1 and the second resource sensing diagram 624-2 represents time, and a vertical axis of the first resource sensing diagram 624-1 and the second resource sensing diagram 624-2 represents frequency. In a manner similar to that described with regard to FIG. 6A, the resource sensing diagrams 624-1 and 624-1 may be partitioned in time and frequency, and a sidelink air interface resource may be characterized based at least in part on a respective time partition and/or a respective frequency partition.

In the example 602, the first UE 604 senses (e.g., based at least in part on measurement metrics and the FD beam pair 622-1) that a first sidelink air interface resource 626-1 may be busy and/or occupied (shown with a diagonal pattern), that a second sidelink air interface resource 628-1 and a third sidelink air interface resource 630-1 may be unoccupied, that a fourth sidelink air interface resource 632-2 may include and/or be susceptible to self-interference at the first UE 604, and that a fifth sidelink interface resource 634-1 may be clear and/or unoccupied. Accordingly, the first UE 604 may generate a first resource sensing report that is based at least in part on resource sensing performed by the first UE 604, and the first resource sensing report may indicate a respective availability state of one or more sidelink air interface resources. As shown by reference number 636, the first UE 604 may transmit the first resource sensing report to the second UE 606, such as by transmitting the first resource sensing report in a PSCCH and/or a PSSCH.

Alternatively, or additionally, the second UE 606 may generate a second resource sensing report and transmit the second resource sensing report to the first UE 604. To illustrate, and as shown by FIG. 6B, the second sensing report may indicate that the second UE 606 observes, based at least in part on performing a resource sensing procedure using the second FD beam pair 622-2, that a first sidelink air interface resource 626-2 may be occupied, that a second sidelink air interface resource 628-2 may be unoccupied and a third sidelink air interface resource 630-2 may be unoccupied, that a fourth sidelink may be resource 632-2 may include and/or be susceptible to self-interference at the second UE 606, and/or that a fifth sidelink air interface resource 634-2 is clear and/or unoccupied. The second resource sensing report may be based at least in part on resource sensing performed by the second UE 606 and may indicate respective availability states of one or more sidelink air interface resources.

The first UE 604 and/or the second UE 606 may analyze the respective resource sensing report from the other UE to identify one or more common availability resources. Alternatively or additionally, the first UE 604 and/or the second UE 606 may analyze the resource sensing report from the other UE to identify non-common availability resources. In the example 602, the first UE 604 and/or the second UE 606 each identify that the second sidelink air interface resource, the third sidelink air interface resource, and the fifth sidelink air interface resource are common availability resources. Accordingly, the first UE 604 and the second UE 606 may determine to transmit and/or receive FD sidelink communications with one another based at least in part on using the second sidelink air interface resource, the third sidelink air interface resource, and the fifth sidelink air interface resource. Alternatively or additionally, the first UE 604 and/or the second UE 606 may transmit and/or receive an HD sidelink communication in at least one non-common availability resource as described below with regard to FIG. 7.

By sharing resource sensing results with a second UE, a first UE may perform coordinated resource sensing to identify common availability resource(s) that may be used to transmit and/or receive FD sidelink communications. Using common availability resource(s) that are identified based at least in part on coordinated resource sensing for FD sidelink communications may result in improved signal quality (e.g., decreased interference and/or decreased distortion) and/or improved sidelink performance (e.g., fewer recovery errors, increased data throughput, and/or decreased data transfer latencies) relative to resource selection without feedback and/or without sensing coordination.

As indicated above, FIGS. 6A and 6B are provided as examples. Other examples may differ from what is described with regard to FIGS. 6A and 6B.

Figure 7:
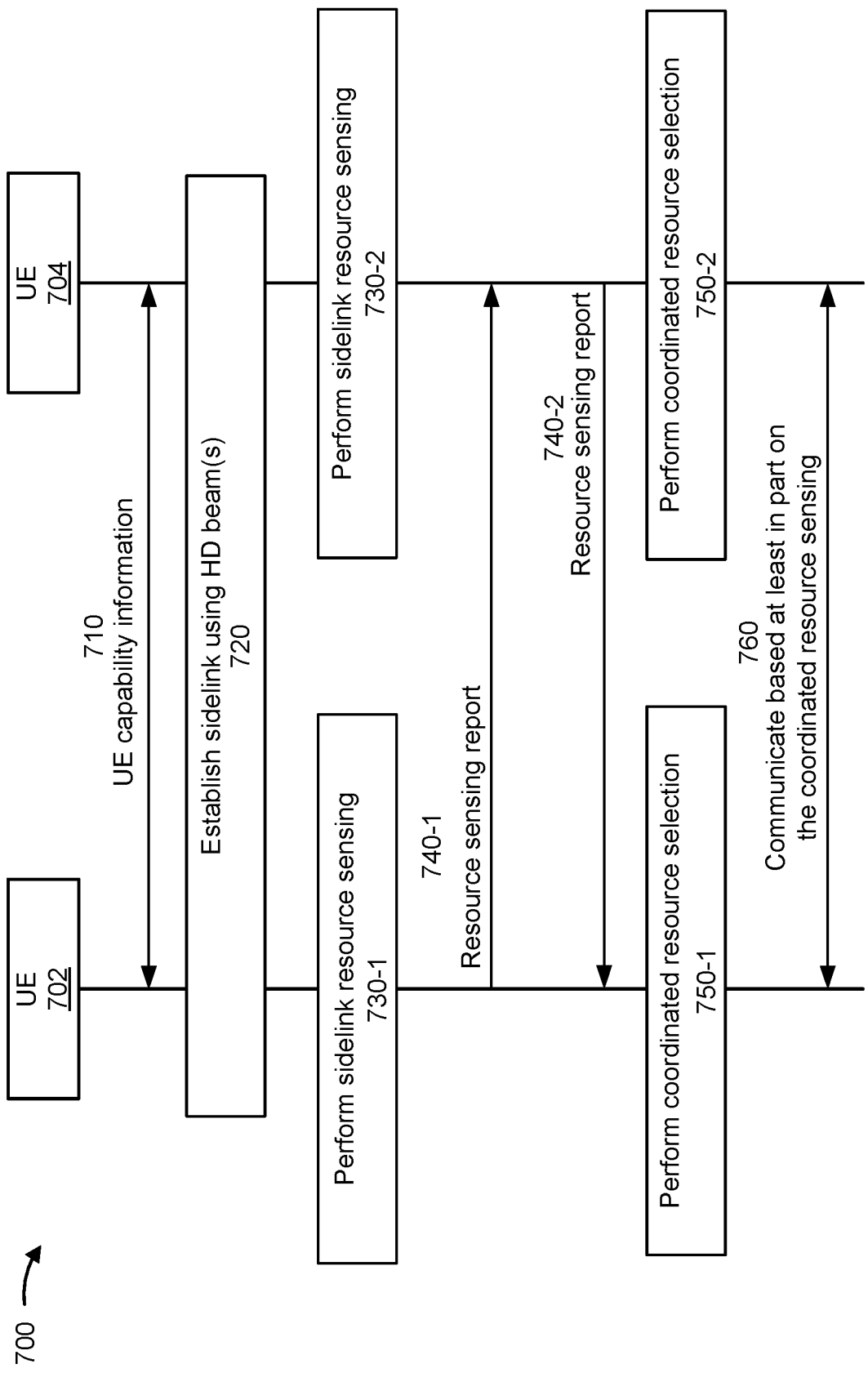
FIG. 7 is a diagram illustrating an example of a wireless communication process between a first UE and a second UE, in accordance with the present disclosure.

FIG. 7 is a diagram illustrating an example 700 of a wireless communication process between a first UE 702 (e.g., a UE 120) and a second UE 704 (e.g., another UE 120), in accordance with the present disclosure.

As shown by reference number 710, the first UE 702 may transmit, and the second UE 704 may receive, first UE capability information that indicates one or more capabilities associated with the first UE 702. Alternatively, or additionally, the second UE 704 may transmit, and the first UE 702 may receive, second UE capability information that indicates one or more capabilities associated with the second UE 704. In some aspects the first UE 702 and/or the second UE 704 may transmit the respective UE capability information as part of a sidelink discovery process, such as a sidelink discovery process associated with establishing a Mode 2 sidelink between two UEs. Alternatively, or additionally, the first UE 702 and/or the second UE 704 may transmit the respective UE capability information as part of a radio resource control (RRC) procedure, such as an RRC setup procedure, and/or after establishing an RRC connected state. The first UE 702 and/or the second UE 704 may transmit the UE capability information in sidelink control information, such as by broadcasting the control information using a PSCCH. Alternatively, or additionally, the first UE 702 and/or the second UE 704 may transmit the respective UE capability information in a multicast message (also referred to as a groupcast message) and/or a unicast message based at least in part on using the PSCCH and/or a PSSCH. Accordingly, a UE may transmit and/or receive the UE capability information based at least in part on a sidelink.

In some aspects, the UE capability information may indicate, as part of the UE capability information, FD sidelink capability information. To illustrate, the FD sidelink capability information may include, by way of example and not of limitation, one or more supported FD modes (e.g., an IBFD mode, a partially-overlapped FD mode, a fully-overlapped FD mode, and/or an SBFD mode). Other examples of FD capability information may include a link type on which the UE supports FD (e.g., a sidelink, an access link, and/or a relay link), and/or one or more channel types (e.g., PSSCH and/or PSCCH) supported for FD. In some aspects, the first UE 702 and/or the second UE 704 may prioritize connecting with an FD-capable device, and select to connect with one another based at least on part on each UE being FD-capable and/or based at least in part on identifying one or more common FD capabilities supported by each of the UEs.

As shown by reference number 720, the first UE 702 and the second UE 704 may establish one or more sidelinks based at least in part on one or more HD beam pairs. For example, the first UE 702 may select a first HD transmit beam and/or the second UE 704 may select a first HD receive beam for communication(s) associated with a first transmission direction that is from the first UE 702 to the second UE 704. Alternatively, or additionally, the second UE 704 may select a second HD transmit beam and/or the first UE 702 may select a second HD receive beam for a second HD beam pair associated with communication(s) in a second transmission direction from the second UE 704 to the first UE 702.

Based at least in part on selecting the HD beam pair(s), the first UE 702 and/or the second UE 704 may communicate with one another using the sidelink and/or air interface resource pool selection (e.g., Mode 2 communications). For instance, the first UE 702 may transmit, and the second UE 704 may receive, a first HD sidelink communication based at least in part on a first HD beam pair and a first sidelink air interface resource reserved by the first UE 702. Alternatively, or additionally, the second UE 704 may transmit, and the first UE 702 may receive, a second HD sidelink communication based at least in part on a second HD beam pair and a second sidelink air interface resource reserved by the second UE 704.

To illustrate, the first UE 702 may select a first HD transmit beam and/or the second UE 704 may select a first HD receive beam, for communication(s) associated with a first transmission direction that is from the first UE 602 to the second UE 604. Alternatively, or additionally, the second UE 704 may select a second HD transmit beam and/or the first UE 702 may select a second HD receive beam, for a second HD beam pair associated with communication(s) in a second transmission direction from the second UE 604 to the first UE 602. In some aspects, the first UE 702 and/or the second UE 704 may select each transmit and/or receive beam based at least in part on one or more beam sweeping procedures.

A transmit-side beam sweeping procedure may include a transmitting UE iteratively alternating between transmit beams in a set of transmit beams for transmitting a reference signal. A receive-side beam sweeping procedure may include a receiving UE iteratively alternating between receive beams in a set of receive beams for receiving the reference signal. In some aspects, a receiving UE may generate a respective signal metric, such as an RSRP metric and/or an RSSI metric, and select an HD receive beam that results in better received signal quality (e.g., a higher RSRP) at the receiving UE relative to other HD receive beams. Alternatively, or additionally, the receiving UE may transmit feedback (e.g., a measurement report and or a measurement metric) to the transmitting UE to enable the transmitting UE to select a transmit beam that results in better received signal quality at the receiving UE. Accordingly, the first UE 702 and/or the second UE 704 may communicate with one another based at least in part on using one or more serial HD sidelink transmissions, an HD beam pair, and/or sidelink and/or air interface resource pool selection (e.g., Mode 2 communications).

In some aspects, the first UE 702 and/or the second UE 704 may select one or more FD beam pairs. To illustrate, based at least in part on selecting one or more HD beam pairs, the first UE 702 and/or the second UE 704 may generate one or more self-interference metrics and/or signal metrics based at least in part on the one or more HD sidelink transmission(s). For example, the first UE 702 and/or the second UE 704 may generate the self-interference metrics based at least in part on ongoing HD communications (e.g., HD communications that includes data traffic) and using one or more HD transmit beam(s) that the first UE 702 and/or the second UE 704 has identified for HD (transmit) communications (e.g., via a sidelink beam sweeping procedure) and/or one or more HD receive beams that the first UE 702 and/or the second UE 704 has identified for HD (receive) communications.

To illustrate, the first UE 702 and/or the second UE 704 may generate a self-interference metric based at least in part on using a current HD transmit beam and performing a receive-side beam sweeping procedure that pairs the current HD transmit beam with one or more receive beams. Alternatively, or additionally, the first UE 702 and/or the second UE 704 may generate self-interference metric(s) based at least in part on performing a transmit-side beam sweeping procedure in which the first UE 702 and/or the second UE 704 iterates through HD transmit beams for transmitting one or more HD communications. The first UE 702 and/or the second UE 704 may select an FD beam pair based at least in part on selecting beams that mitigate self-interference (e.g., at the respective UE and/or at other UEs). The self-interference metrics may include in-band self-interference metrics and/or out-of-band self-interference metric(s).

As shown by reference number 730-1, the first UE 702 may perform sidelink resource sensing. Alternatively, or additionally, as shown by reference number 730-2, the second UE 704 may perform sidelink resource sensing. In some aspects, the first UE 702 and/or the second UE 704 may perform the sidelink resource sensing based at least in part on using a (respective) omnidirectional beam as a sensing beam, as described with regard to FIG. 6A. Alternatively, or additionally, the first UE 702 and/or the second UE 704 may perform the sidelink resource sensing using, as a sensing beam, at least part of a (respective) FD beam pair, as described with regard to FIG. 6B. In some cases, the first UE 702 may use a different type of sensing beam than the second UE 704 uses. That is, the first UE 702 may use an omnidirectional beam as a first sensing beam for sidelink resource sensing and the second UE 704 may use at least part of an FD beam pair (e.g., an FD transmit beam, an FD receive beam, or both the FD transmit beam and the FD receive beam) as second sensing beam(s) for sidelink resource sensing (or vice versa).

As described above, the first UE 702 and/or the second UE 704 may use, as a sensing beam, an omnidirectional beam. Performing resource sensing using an omnidirectional beam may increase a sensing sensitivity of the first UE 702 and/or the second UE 704 and result in the first UE 702 and/or the second UE 704 observing more signals in a sidelink air interface resource (e.g., more signals that satisfy a power threshold) relative to performing resource sensing with a narrower beam as described above. Accordingly, the first UE 702 and/or the second UE 704 may observe fewer unoccupied and/or available resources and, subsequently, refrain from selecting an air interface resource for a future sidelink transmission. In some aspects, the increased sensing sensitivity associated with using an omnidirectional beam may provide protection to other transmissions that may be susceptible to interference and/or distortion based at least in part on the first UE 702 and/or the second UE 704 refraining from using the air interface resource for a sidelink transmission (e.g., that may be a potential source of the interference and/or the distortion). That is, resource sensing that is based at least in part on an omnidirectional beam may have increased sensing sensitivity (e.g., relative to resource sensing using a directional beam) based at least in part on the omnidirectional beam observing more signals as described above. Alternatively, or additionally, resource sensing that is based at least in part on an omnidirectional beam may have reduced beamforming gain (e.g., relative to resource sensing using a directional beam, resulting in reduced sensitivity for weak signals during sensing. However, the reduced beamforming gain of the omnidirectional beam may provide a reduction in interference and/or distortion to other transmissions in scenarios associated with using the omnidirectional beam for a transmission.

As described below, the first UE 702 and/or the second UE 704 may perform resource sensing based at least in part on an omnidirectional beam, and communicate using a narrow beam (e.g., an HD beam and/or an FD beam) that is positioned and/or lies within the propagation path of the omnidirectional beam.

As described with regard to FIG. 6B, the first UE 702 and/or the second UE 704 may use, as one or more sensing beams, at least part of an FD beam pair, such as an FD transmit beam included in the FD beam pair, an FD receive beam included in the FD beam pair, and/or both the FD transmit beam and the FD receive beam. Each UE may have a respective FD beam pair and, as described above with regard to FIG. 5, the beams included in the FD beam pair may differ from HD beams used by the UE for HD communication based at least in part on different selection criteria. To illustrate, the first UE 702 and/or the second UE 704 may select one or more HD beams based at least in part on increasing SNR for a transmission and may select an FD beam pair based at least in part on mitigating self-interference.

To illustrate, a UE (e.g., the first UE 702 and/or the second UE 704) may generate self-interference metrics for one or more pairings of transmit beams and receive beams using one or more HD communications, such as HD communications described with regard to reference number 720. The UE may select, as the FD beam pair, a transmit beam and receive beam pairing that mitigates self-interference better than other pairings. The self-interference metrics may be generated based at least in part on using measurement band(s) that are associated with fully-overlapped FD communications (e.g., a worst case scenario), partially overlapped FD communications, and/or non-overlapping FD communications (e.g., a best case scenario). Accordingly, each UE may select a respective FD beam pair to use for FD sidelink communications based at least in part on mitigating self-interference at the UE. As one example, a UE may select the FD beam pair based at least in part on self-interference metrics associated with a worst case scenario (e.g., fully-overlapped FD communications) such that the FD beam pair may also effectively mitigate self-interference in other, better scenarios. As another example, a UE may select specific FD beam pairs for FD communications in specific frequency bands (e.g., sub-bands in SBFD) resulting in multiple FD beam pairs being selected.

As described above, the UE (e.g., the first UE 702 and/or the second UE 704) may perform resource sensing based at least in part on using, as sensing beam(s), one or more beams included in the selected FD beam pair. As one example, the UE May perform resource sensing based at least in part on (only) an FD transmit beam of the FD beam pair. To illustrate, the UE may configure an antenna panel to receive signals based at least in part on the FD transmit beam, such as by configuring the antenna panel and/or receiver based at least in part on a spatial width and/or direction of the FD transmit beam. Performing resource sensing using only an FD transmit beam may enable the UE to identify a sidelink air interface resource that is susceptible to interference by a transmission associated with the FD transmit beam. Accordingly, using only the FD transmit beam as the sensing beam may mitigate interference to other active links by refraining from selecting a sidelink air interface resource with an occupied availability state (e.g., as sensed by the UE). Sensing using only the FD transmit beam may be useful when the UE has limited (e.g., one) antenna-panels available for sensing. In some aspects, and during FD sidelink communication with another UE, the UE may use the sensing FD transmit beam as part of an FD beam pair. Sensing that is based at least in part on (only) the FD transmit beam may prioritize providing interference protection to other UEs over providing protection to an FD receive link associated with the FD beam pair. That is, sensing with the FD transmit beam enables the UE to identify how an FD transmission that is based at least in part on the FD transmit beam may interfere with other transmissions.

As another example, the UE (e.g., the first UE 702 and/or the second UE 704) may use, as the sensing beam, an FD receive beam of the FD beam pair (e.g., by configuring an antenna panel based at least in part on the FD receive beam). Using the FD receive beam as a sensing beam may enable the UE to identify an occupied sidelink air interface resource that, subsequently, results in interference at the UE when performing reception using the FD receive beam and the occupied sidelink air interface resource. Accordingly, based at least in part on using the FD receive beam as a sensing beam, the UE may refrain from selecting the occupied sidelink air interface resource and improve a received signal quality by reducing interference and/reducing distortion in a signal received by the UE. Sensing that is based at least in part on (only) the FD receive beam may prioritize providing protection to an FD receive link associated with the FD beam pair over providing interference protection to other UEs. That is, sensing with the FD receive beam enables the UE to identify how the FD receive beam may observe transmissions from other UEs.

As yet another example, the UE (e.g., the first UE 702 and/or the second UE 704) may use, as the sensing beam, the FD beam pair (e.g., both the FD transmit beam and the FD receive beam). To illustrate, the UE may configure a first antenna panel based at least in part on the FD transmit beam and a second antenna panel based at least in part on the FD receive beam. By using both the FD transmit beam and the FD receive beam as sensing beams, a UE may sense a sidelink air interface resource that reduces interference at the UE (e.g., via sensing using FD receive beam) and reduces interference at another UE (e.g., via sensing using the FD transmit beam). That is, the UE may perform collective sensing of the sidelink air interface resource using the FD transmit beam (e.g., and the first antenna panel) and the FD receive beam (e.g., and the second anna panel) to identify an unoccupied sidelink air interface resource. Accordingly, the UE may generate first sidelink resource sensing results based at least in part on using the FD transmit beam and second sidelink resource sensing results based at least in part on using the FD receive beam. The UE may identify, as an unoccupied sidelink air resource, a sidelink air interface resource that the first sidelink resource sensing results and the second sidelink resource sensing results each indicate has an unoccupied availability state. The use of a directional beam (e.g., an FD transmit beam, an FD receive beam, or both the FD transmit beam and the FD receive beam) for a resource sensing procedure may result in a UE identifying different available and/or unoccupied air interface resources, relative to using an omnidirectional beam for the resource sensing procedure. For instance, and as described above, the use of a directional beam as a sensing beam may reduce a spatial width used to receive signals for sensing and, subsequently, result in a UE identifying more available and/or unoccupied sidelink air interface resources.

In some aspects, the UE (e.g., the first UE 702 and/or the second UE 704) may use dedicated antenna panels for specific communications (e.g., HD communications and/or FD communications). As one example, the UE may use a first antenna panel for HD transmission, a second antennal panel for HD reception, a third antenna panel for FD transmission, and/or a fourth antenna panel for FD reception. The UE may configure each antenna panel based at least in part on a respective beam (e.g., an HD transmit beam, an HD receive beam, an FD transmit beam, and/or an FD receive beam). Alternatively, or additionally, the UE may use dedicated antenna subarrays of one or more antenna panels for the specific communications (e.g., a first antenna subarray for HD transmission, a second antenna subarray for HD reception, a third antenna subarray for FD transmission, and/or a fourth antenna subarray for FD reception). Accordingly, based at least in part on including multiple antenna panels and/or one or more partitionable antenna panels, a UE may perform collective sensing, contemporaneous sensing, and/or simultaneous sensing. To illustrate, the UE may perform HD resource sensing (e.g., sidelink air interface resource sensing based at least in part on one or more HD beams) contemporaneously and/or simultaneously with FD resource sensing (e.g., sidelink air interface resource sensing based at least in part on one or more FD beams) using the dedicated antenna panels and/or the dedicated subarrays. Alternatively, or additionally, the UE may perform contemporaneous and/or simultaneous resource sensing using both beams of an FD beam pair. The multi-panel sensing and/or multi-subarray sensing may include using an omnidirectional beam and/or at least a portion of an FD beam pair. That is, based at least in part on using different beams for HD communications and FD communications, the UE may determine an HD availability state of a sidelink air interface resource for HD sidelink communications using sensing on one or more HD beams, and an FD availability state of the (same) sidelink air interface resource for FD sidelink communications using sensing on one or more FD beams.

In some aspects, and as part of multi-panel and/or multi-subarray sensing, the UE (e.g., the first UE 702 and/or the second UE 704) may configure each antenna panel based at least in part on a respective omnidirectional beam. Because resource sensing that uses an omnidirectional beam has higher sensing sensitivity relative to resource sensing that uses a directional beam, the UE may identify an unoccupied sidelink air interface resource that may be used for an HD communication and/or an FD communication. To illustrate, and as described above, using an omnidirectional beam for resource sensing may result in more sidelink air interface resources having an occupied availability state and/or fewer sidelink air interface resources having an unoccupied availability state based at least in part on the wider spatial width of the omnidirectional beam observing more signal presence. Alternatively, or additionally, a first propagation path associated with an HD beam and/or an FD beam may lie inside a second propagation path associated with the omni-directional beam. Accordingly, an availability state that is sensed by the UE using the omnidirectional beam may be used for transmission and/or reception by the HD beam and/or the FD beam based at least in part on the omnidi-rectional beam including the HD beam and/or the FD beam.

As described above, a UE (e.g., the first UE 702 and/or the second UE 704) may configure a respective antenna panel based at least in part on a respective directional beam (e.g., an HD transmit beam, an HD receive beam, an FD transmit beam, and/or an FD receive beam), and perform HD resource sensing contemporaneously and/or simultaneously with FD resource sensing. HD resource sensing that is simultaneous and/or contemporaneous with FD resource sensing may reduce an amount of time that the UE uses to perform sidelink resource sensing relative to serialized resource sensing. That is, the UE may determine an HD availability state of a sidelink air interface resource contemporaneously and/or simultaneously with determining an FD availability state of the (same) sidelink air interface resource. To illustrate, and as described below, the first UE 702 may identify a sidelink air interface resource as being a non-common availability resource based at least in part on coordinated resource selection with the second UE 704. The first UE 702 may subsequently perform HD resource sensing based at least in part on an HD beam to identify an unoccupied sidelink air interface resource for HD communications. Based at least in part on the different beam characteristics, the use of an HD beam for HD resource sensing may provide more accurate resource availability state(s) for sidelink air interface resource(s) to use for HD communications relative to using an FD beam. Accordingly, in some aspects, the UE may perform simultaneous and/or contemporaneous HD resource sensing and FD resource sensing to obtain more accurate HD resource availability states (e.g., using an HD beam) and to reduce the amount of time associated with the UE performing HD resource sensing and FD resource sensing.

As part of sensing as described with regard to FIG. 5, and using either an omnidirectional beam or at least a portion of an FD beam pair as a sensing beam, the first UE 702 and/or the second UE 704 may identify available and/or unoccupied sidelink air interface resource(s) based at least in part on one or more time slots, one or more sub-bands, and/or one or more sub-channels. In some aspects, each UE may identify and/or attempt to identify a number of air interface resources that satisfy a bandwidth associated with transmitting an amount of data by the UE. For example, the first UE 702 may identify, as part of performing sensing as described with regard to reference number 730-1, N1 sub-channels and the second UE 704 may identify, as part of performing sensing as described with regard to reference number 730-2, N2 sub-channels, where N1 and N2 are integers. A size and or bandwidth of a sub-channel and/or sub-band may be configured by a network node.

As shown by reference number 740-1, the first UE 702 may transmit, and the second UE 704 may receive, a first sidelink resource sensing report. Alternatively, or additionally, as shown by reference number 740-2, the second UE 704 may transmit, and the first UE 702 may receive, a second sidelink resource sensing report. As one example, the first UE 702 and/or the second UE 704 may transmit a respective sidelink sensing report in the PSCCH and/or the PSSCH. As described above with regard to FIGS. 6A and 6B, a sidelink resource sensing report may indicate a respective availability state of one or more sidelink air interface resources. In some aspects, the first UE 702 and/or the second UE 704 may transmit multiple sidelink sensing reports, such as an FD sidelink resource sensing report and an HD sidelink resource sensing report that are generated based at least in part on contemporaneous HD resource sensing and FD resource sensing.

As shown by reference number 750-1, the first UE 702 may perform coordinated resource selection based at least in part on receiving the second sidelink resource sensing report from the second UE 704. Alternatively, or additionally, as shown by reference number 750-2, the second UE 704 may perform coordinated resource selection based at least in part on receiving the first sidelink resource sensing report from the first UE 702. The first UE 702 and/or the second UE 704 may analyze both sidelink resource sensing reports to identify one or more sidelink air interface resources that each UE identifies as being available and/or unoccupied (e.g., a common availability resource). In some aspects, the first UE 702 and/or the second UE 704 may transmit and/or receive FD sidelink communications based at least in part on using a common availability resource.

Alternatively, or additionally, the first UE 702 and/or the second UE 704 may analyze both sidelink resource sensing reports to identify one or more sidelink air interface resources that have different availability states and/or have a (collective) occupied availability state (e.g., a non-common availability resource). For example, the first UE 702 may sense a first availability state (e.g., an unoccupied availability state) for a sidelink air interface resource that is different from a second availability state (e.g., an occupied availability) sensed by the second UE 704 for the (same) sidelink air interface resource. As another example, the first UE 702 and the second UE 704 may both sense an occupied availability state for the sidelink air interface resource. Accordingly, by exchanging sidelink resource sensing reports and performing coordinated resource sensing, the first UE 702 and the second UE 704 may identify a common availability resource to use for FD sidelink communications, and/or a non-common availability resource to use for other sidelink communications (e.g., HD sidelink communications). In some aspects, the first UE 702 and/or the second UE 704 may determine to use a common availability resource for HD sidelink communications. To illustrate, the first UE 704 may determine to use N/common availability resources for FD communications, and the second UE may determine to use N2 common availability resources for FD communications, where N1 is a first integer and N2 is a second integer that is different from N1. Based at least in part on the first UE 702 and the second UE 704 determining to use a different number of common availability resources for FD communications, the first UE 702 and the second UE 704 may coordinate to use the fewest number of common availability resources of FD communications. For example, if N1<N2, the first UE 702 and the second UE 704 may coordinate the FD communications to use N1 common availability resources. However, using the fewer number of common availability resources (e.g., the N1 common availability resources) may result in some common availability resources being unassigned to FD communications. Accordingly, the first UE 702 and/or the second UE 704 may use unassigned and/or remaining common availability resources for HD communications.

As shown by reference number 760, the first UE 702 and the second UE 704 may communicate via the sidelink based at least in part on the coordinated resource sensing. To illustrate, the first UE 702 and the second UE 704 may transmit and/or receive FD sidelink communications based at least in part on using a sidelink air interface resource that is identified as a common availability resource, as described with regard to reference number 750-1 and reference number 750-2. In some aspects, each UE may transmit and/or receive the FD sidelink communications based at least in part on using a respective FD beam pair that was selected by the UE based at least in part on mitigating self-interference as described above. In at least one example, the (respective) FD beam pair may be selected by the UE based at least in part on a self-interference metric associated with fully-overlapping FD communications such that the FD beam pair may mitigate self-interference for a combination of FD communication modes (e.g., a fully-overlapping in-band FD mode, a partially-overlapping in-band FD mode, a sub-band FD mode, and/or non-overlapping FD mode).

Alternatively, or additionally, the UE may select, as the FD beam pair, a sub-band specific FD beam pair associated with one or more specific sub-bands for transmitting and/or receiving the FD sidelink communications. To illustrate, the first UE 702 may use a first FD beam pair that was selected based at least in part on mitigating self-interference in a (specific) first sub-band (e.g., resource block 0 through resource block 19). Alternatively, or additionally, the second UE 704 may use a second FD beam pair that was selected by the second UE 704 based at least in part on mitigating self-interference in a second sub-band (e.g., resource block 20 through resource block 39). The first UE 702 and the second UE 704 may transmit and/or receive the FD sidelink communications based at least in part on using the sub-band specific FD beam pair, the first sub-band, and/or the second sub-band.

In some aspects, the first UE 702 and/or the second UE 704 may transmit and/or receive HD sidelink communications using a sidelink air interface resource that has been identified as a non-common availability resource (e.g., using coordinated resource sensing). As one example, and as described above with regard to reference number 730-1 and reference number 730-2, a UE (e.g., the first UE 702 and/or the second UE 704) may sense the sidelink resource availability based at least in part on an omnidirectional beam, and use an HD transmit beam or HD receive beam, respectively, to transmit and/or receive an HD sidelink communication using the non-common availability resource. In some aspects, the UE may select a number of non-common availability resources to use for HD sidelink communications based at least in part on an amount of data being transmitted by the UE. Alternatively, or additionally, the UE may randomly choose the non-common availability resource(s), such as in a scenario in which more non-common availability resource(s) are available than needed for the amount of data being transmitted.

Alternatively, or additionally, the first UE 702 and/or the second UE 704 may transmit and/or receive a HD sidelink communication using a sidelink air interface resource that has been identified as a common availability resource as described above. To illustrate, the first UE 702 and the second UE 704 may determine to use different quantities and/or numbers of common availability resources such that, after coordinating FD communication resource selection, some common availability resources may remain unassigned to FD communications. Accordingly, the first UE 702 and/or the second UE 704 may transmit and/or receive an HD communication using one or more common availability resources that are unassigned to FD communications.

As another example, and as described above with regard to reference number 730-1 and/or the reference number 730-2, a UE (e.g., the first UE 702 and/or the second UE 704) may sense the sidelink resource availability based at least in part on using at least a portion of an FD beam pair as the sensing beam, and may use an FD transmit beam and/or an FD receive beam (e.g., of the FD beam pair used for the sensing beam) to transmit and/or receive an HD sidelink communication using the non-common availability resource. That is, the UE may use an FD (sensing) transmit beam as an HD transmit beam and/or an FD (sensing) receive beam as an HD receive beam for one or more HD sidelink communications. Accordingly, the UE may use a sensing transmit beam and/or a sensing receive beam for one or more HD sidelink communications that use the non-common availability resource and/or a common availability resource. In some aspects, using a non-sensing beam (e.g., a beam that was not used for resource sensing) for transmitting and/or receiving an HD sidelink communication may be disallowed.

As yet another example, a UE (e.g., the first UE 702 and/or the second UE 704) may sense sidelink resource availability based at least in part on using at least a portion of an FD beam pair, identify one or more non-common availability resources using coordinated resource sensing, and use one or more HD beams (e.g., an HD transmit beam and/or an HD receive beam) for transmitting and/or receiving the HD sidelink communication(s). That is, the UE may perform sidelink resource sensing using at least a first directional beam (at least a portion of an FD beam pair), and use a second, different directional beam (e.g., an HD transmit beam and/or an HD receive beam) to transmit and/or receive an HD sidelink communication using the non-common availability resource. To illustrate, and as described above, a UE may select different beams for HD sidelink communications and FD sidelink communications based at least in part on different selection criteria. Accordingly, using the HD beam(s) for transmission and/or reception of an HD sidelink communication using the non-common availability resource may improve a signal quality (e.g., an increased power level) of the transmission.

In some aspects, a UE (e.g., the first UE 702 and/or the second UE 704) may perform additional sidelink resource sensing based at least in part on using the HD beam(s). To illustrate, the UE may perform the additional sidelink resource sensing on sidelink air interface resources that have been identified as non-common availability resource(s) and/or common availability resource(s) (e.g., that are unassigned to FD communications), as described with regard to reference number 750-1 and/or reference number 750-2. That is, the UE may perform serial sidelink resource sensing (e.g., first performing FD sidelink resource sensing using FD beam(s) and then performing HD sidelink resource sensing using HD beam(s)). In some examples, the UE may transmit an indication of an HD sidelink resource sensing report using the sidelink, while in other examples, the UE may refrain from indicating any results from the additional sidelink resource sensing.

In other aspects, and as described above, a UE (e.g., the first UE 702 and/or the second UE 704) may perform HD resource sensing contemporaneously and/or simultaneously with FD sidelink resource sensing at a prior point in time. Accordingly, the UE may evaluate HD sensing results after identifying the non-common availability resource(s), and select one or more non-common availability resource(s) and/or one or more common availability resource(s) for HD sidelink communications based at least in part on the HD resource sensing. The UE may transmit and/or receive an HD sidelink communication based at least in part on an HD beam used to perform HD sidelink resource sensing.

By sharing resource sensing results with a second UE, a first UE may perform coordinated resource sensing to identify common availability resource(s) that may be used to transmit and/or receive FD sidelink communications. Using common availability resource(s) for FD sidelink communications may result in improved signal quality (e.g., decreased interference and/or decreased distortion) and/or improved sidelink performance (e.g., fewer recovery errors, increased data throughput, and/or decreased data transfer latencies) relative to resource selection without feedback and/or without sensing coordination.

As indicated above, FIG. 7 is provided as an example. Other examples may differ from what is described with regard to FIG. 7.

Figure 8:
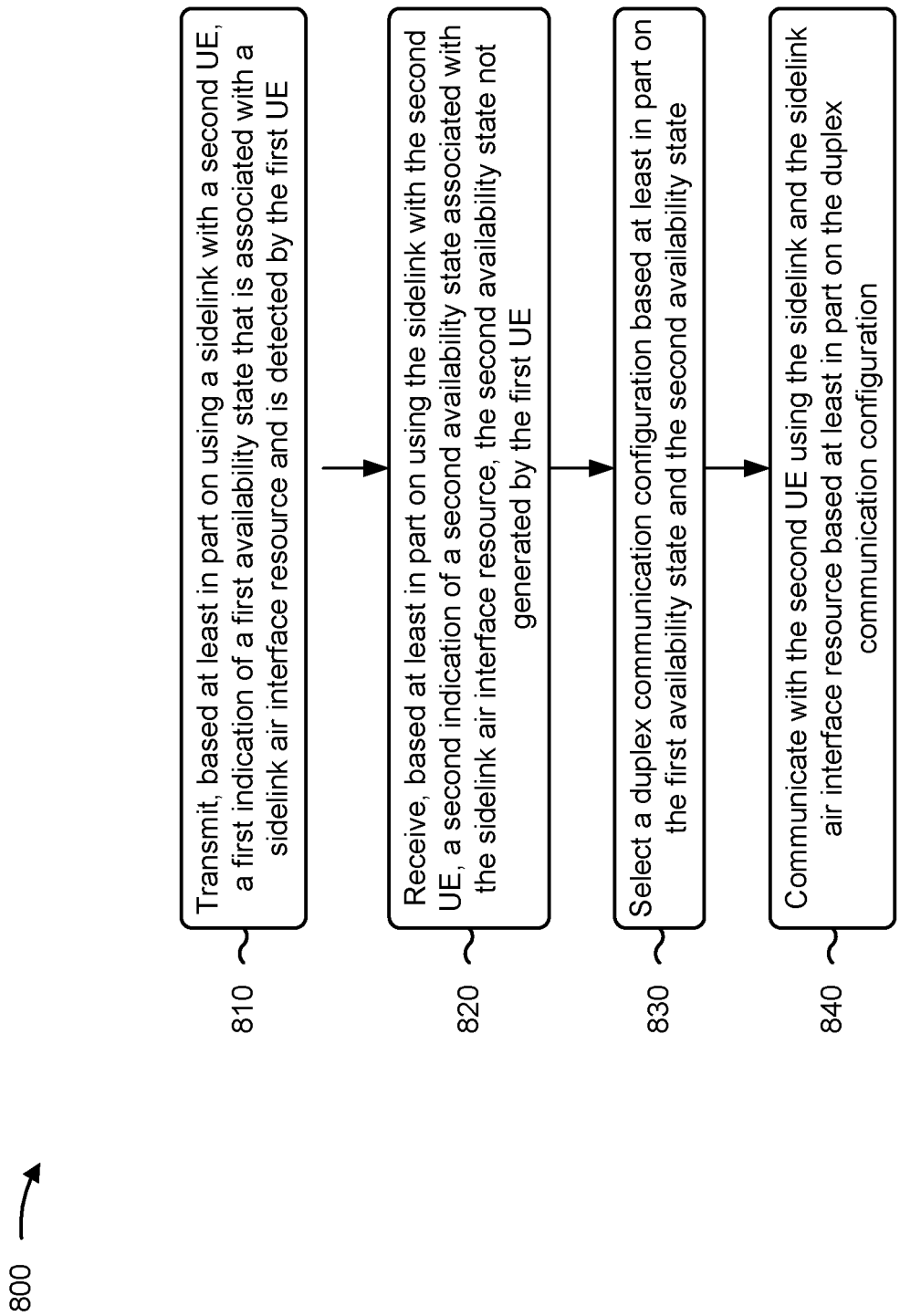
FIG. 8 is a diagram illustrating an example process performed, for example, by a UE, in accordance with the present disclosure.

FIG. 8 is a diagram illustrating an example process 800 performed, for example, by a first UE, in accordance with the present disclosure. Example process 800 is an example where the first UE (e.g., UE 120) performs operations associated with coordinated sidelink air interface resource selection for FD communications.

As shown in FIG. 8, in some aspects, process 800 may include transmitting, based at least in part on using a sidelink with a second UE, a first indication of a first availability state that is associated with a sidelink air interface resource and is detected by the first UE (block 810). For example, the first UE (e.g., using transmission component 904 and/or communication manager 906, depicted in FIG. 9) may transmit, based at least in part on using a sidelink with a second UE, a first indication of a first availability state associated with a sidelink air interface resource, the first availability state being detected by the first UE, as described above.

As further shown in FIG. 8, in some aspects, process 800 may include receiving, based at least in part on using the sidelink with the second UE, a second indication of a second availability state associated with the sidelink air interface resource, the second availability state not generated by the first UE (block 820). For example, the first UE (e.g., using reception component 902 and/or communication manager 906, depicted in FIG. 9) may receive, based at least in part on using the sidelink with the second UE, a second indication of a second availability state associated with the sidelink air interface resource, the second availability state not generated by the first UE, as described above.

As further shown in FIG. 8, in some aspects, process 800 may include selecting a duplex communication configuration based at least in part on the first availability state and the second availability state (block 830). For example, the first UE (e.g., using communication manager 906, depicted in FIG. 9) may select a duplex communication configuration based at least in part on the first availability state and the second availability state, as described above.

As further shown in FIG. 8, in some aspects, process 800 may include communicating with the second UE using the sidelink and the sidelink air interface resource based at least in part on the duplex communication configuration (block 840). For example, the first UE (e.g., using reception component 902, transmission component 904, and/or communication manager 906, depicted in FIG. 9) may communicate with the second UE using the sidelink and the sidelink air interface resource based at least in part on the duplex communication configuration, as described above.

Process 800 may include additional aspects, such as any single aspect or any combination of aspects described below and/or in connection with one or more other processes described elsewhere herein.

In a first aspect, process 800 includes sensing the first availability state associated with the sidelink air interface resource based at least in part on one or more sensing beams.

In a second aspect, the one or more sensing beams comprise an omnidirectional beam, and communicating with the second UE using the sidelink and the sidelink air interface resource includes communicating with the second UE based at least in part on an FD beam pair.

In a third aspect, the one or more sensing beams comprise at least a first FD beam, and communicating with the second UE using the sidelink includes communicating with the second UE based at least in part on at least a second FD beam.

In a fourth aspect, the at least a first FD beam includes at least one of an FD transmit beam, or an FD receive beam.

In a fifth aspect, the one or more sensing beams comprise a first FD beam pair, and communicating with the second UE using the sidelink includes communicating with the second UE based at least in part on using the FD beam pair.

In a sixth aspect, the one or more sensing beams comprise an FD beam pair, and process 800 includes selecting the FD beam pair based at least in part on a self-interference metric associated with the FD beam pair.

In a seventh aspect, the one or more sensing beams comprise an FD beam pair, and sensing the first availability state includes sensing the first availability state based at least in part on an FD transmit beam in the FD beam pair and an FD receive beam in the FD beam pair.

In an eighth aspect, the first availability state indicates that the sidelink air interface resource is unoccupied, the second availability state indicates that the sidelink air interface resource is unoccupied, and selecting the duplex communication configuration includes selecting an FD communication mode based at least in part on the first availability state indicating that the sidelink air interface resource is unoccupied and the second availability state indicating that the sidelink air interface resource is unoccupied In a ninth aspect, the first availability state is different from the second availability state, and selecting the duplex communication configuration includes selecting an HD communication mode based at least in part on the first availability state being different from the second availability state.

In a tenth aspect, transmitting the first indication of the first availability state includes transmitting the first indication in at least one of a PSCCH, or a PSSCH.

In an eleventh aspect, selecting the duplex communication configuration includes selecting an FD communication mode, process 800 includes selecting an FD beam pair that mitigates self-interference at the first UE, and communicating with the second UE using the sidelink and the sidelink air interface resource includes communicating with the second UE based at least in part on using the FD communication mode and the FD beam pair.

In a twelfth aspect, selecting the FD beam pair includes selecting the FD beam pair based at least in part on a self-interference metric associated with a fully-overlapping FD communication.

In a thirteenth aspect, process 800 includes identifying the sidelink air interface resource as a common availability resource based at least in part on the first availability state and the second availability state indicating that the sidelink air interface resource is unoccupied, and selecting the FD communication mode is based at least in part on identifying the sidelink air interface resource as the common availability resource.

In a fourteenth aspect, the FD beam pair includes at least a first sub-band specific beam for FD transmission and a second sub-band specific beam for FD reception.

In a fifteenth aspect, process 800 includes identifying the sidelink air interface resource as a non-common availability resource based at least in part on the first availability state and the second availability state, selecting the duplex communication configuration includes selecting an HD communication mode, and communicating with the second UE using the sidelink and the sidelink air interface resource includes communicating with the second UE based at least in part on using the HD communication mode and at least one HD beam.

In a sixteenth aspect, process 800 includes sensing the first availability state based at least in part on using at least one of an omnidirectional beam, or at least one FD beam included in an FD beam pair.

In a seventeenth aspect, the sidelink air interface resource is one of multiple sidelink air interface resources, and process 800 includes identifying, from the multiple sidelink air interface resources, a subset of sidelink air interface resources that are non-common availability resources, communicating with the second UE based at least in part on using the HD communication mode includes communicating with the second UE based at least in part on using the subset of sidelink air interface resources that are non-common availability resources, and the subset of sidelink air interface resources includes the sidelink air interface resource.

In an eighteenth aspect, the sidelink air interface resource is one of multiple sidelink air interface resources, process 800 includes sensing a respective availability state of each sidelink air interface resource of the multiple sidelink air interface resources based at least in part on collective sensing that uses an FD transmit beam and an FD receive beam, and the first availability state associated with the sidelink air interface resource is based at least in part on the collective sensing.

In a nineteenth aspect, process 800 includes sensing the first availability state using at least one beam included in an FD beam pair, the FD beam pair including an FD transmit beam and an FD receive beam, and identifying the sidelink air interface resource as a non-common availability resource, and selecting the duplex communication configuration includes selecting an HD communication mode based at least in part on identifying the sidelink air interface resource as the non-common availability resource, and communicating with the second UE using the sidelink and the sidelink air interface resource includes communicating with the second UE using at least one beam of the FD beam pair and the HD communication mode.

In a twentieth aspect, communicating with the second UE based at least in part on using the FD beam pair and the HD communication mode includes at least one of using the FD transmit beam as an HD receive beam, or using the FD receive beam as an HD transmit beam.

In a twenty-first aspect, the sidelink air interface resource is one of multiple sidelink air interface resources, process 800 includes identifying the sidelink air interface resource as a non-common availability resource based at least in part on the first availability state and the second availability state, the duplex communication configuration includes an HD communication mode, and communicating with the second UE using the sidelink and the sidelink air interface resource includes communicating with the second UE based at least in part on using an HD beam and the HD communication mode.

In a twenty-second aspect, process 800 includes sensing, using the HD beam and based at least in part on identifying the sidelink air interface resource as the non-common availability resource, a third availability state associated with the sidelink air interface resource.

In a twenty-third aspect, the first availability state is an FD availability state, and process 800 includes determining the FD availability state based at least in part on first resource sensing that uses an FD beam pair, and determining an HD availability state associated with the sidelink air interface resource based at least in part on second resource sensing that uses the HD beam.

In a twenty-fourth aspect, process 800 includes transmitting a third indication of the HD availability state.

In a twenty-fifth aspect, the first availability state is an FD availability state, and process 800 includes determining, based at least in part on first resource sensing, the FD availability state, and determining, based at least in part on second resource sensing that is contemporaneous with the first resource sensing, an HD availability state associated with the sidelink air interface resource, the second resource sensing being independent of the first resource sensing.

In a twenty-sixth aspect, the first resource sensing is based at least in part on a first antenna panel, and the second resource sensing is based at least in part on a second antenna panel.

In a twenty-seventh aspect, the first resource sensing is based at least in part on an FD beam, and the second resource sensing is based at least in part on an HD beam.

In a twenty-eight aspects, the sidelink air interface resource is one of multiple sidelink air interface resources, and process 800 includes: identifying, from the multiple sidelink air interface resources, a subset of sidelink air interface resources that are common availability resources; assigning a portion of the common availability resources to FD communications; and assigning at least one common availability resource of the subset of sidelink air interface resources to HD communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
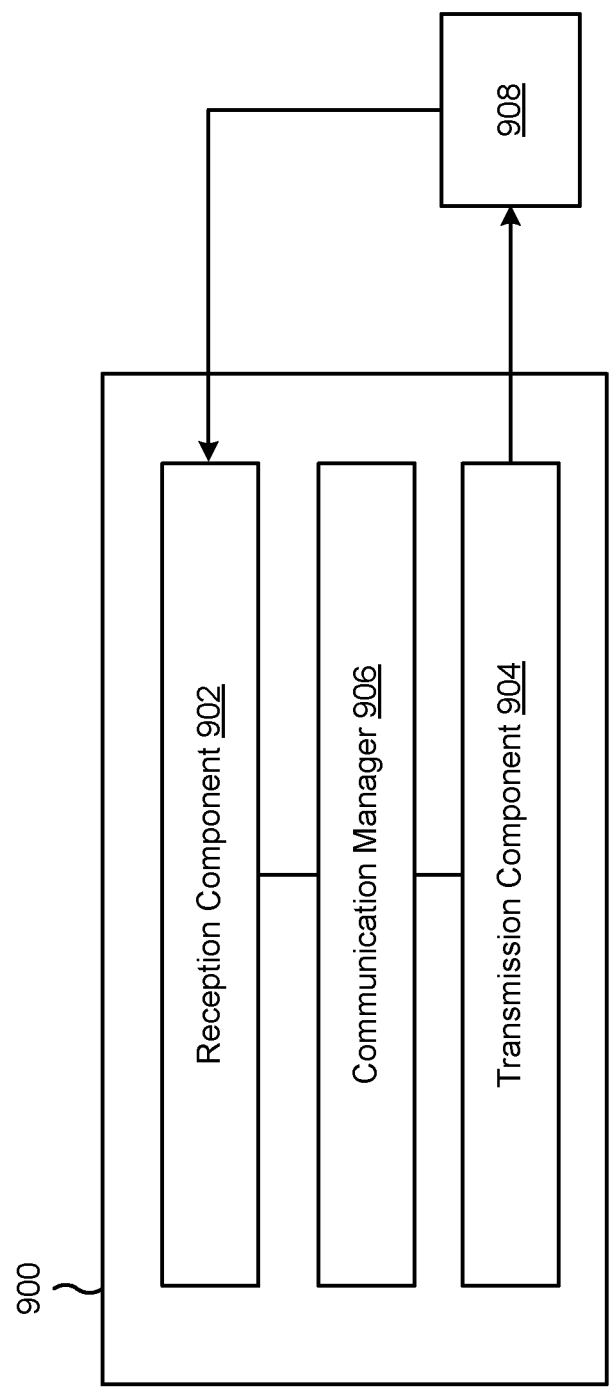
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-8. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit, based at least in part on using a sidelink with a second UE, a first indication of a first availability state associated with a sidelink air interface resource, the first availability state being detected by the first UE. The reception component 902 may receive, based at least in part on using the sidelink with the second UE, a second indication of a second availability state associated with the sidelink air interface resource, the second availability state not generated by the first UE. The communication manager 906 may select a duplex communication configuration based at least in part on the first availability state and the second availability state. The reception component 902 and/or the transmission component 904 may communicate with the second UE using the sidelink and the sidelink air interface resource based at least in part on the duplex communication configuration.

The communication manager 906 may sense the first availability state associated with the sidelink air interface resource based at least in part on one or more sensing beams.

The communication manager 906 may identify the sidelink air interface resource as a common availability resource based at least in part on the first availability state and the second availability state indicating that the sidelink air interface resource is unoccupied.

The communication manager 906 may identify the sidelink air interface resource as a non-common availability resource based at least in part on the first availability state and the second availability state.

The communication manager 906 may sense the first availability state based at least in part on using at least one of an omnidirectional beam, or at least one FD beam included in an FD beam pair.

The communication manager 906 may sense the first availability state using at least one beam included in an FD beam pair, the FD beam pair including an FD transmit beam and an FD receive beam.

The communication manager 906 may identify the sidelink air interface resource as a non-common availability resource.

The communication manager 906 may sense, using the HD beam and based at least in part on identifying the sidelink air interface resource as the non-common availability resource, a third availability state associated with the sidelink air interface resource.

The transmission component 904 may transmit a third indication of the HD availability state.

The communication manager component 906 may identify, from multiple sidelink air interface resources, a subset of sidelink air interface resources that are common availability resources, assign a portion of the common availability resources to FD communications; and assign at least one common availability resource of the subset of sidelink air interface resources to HD communications.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: transmitting, based at least in part on using a sidelink with a second UE, a first indication of a first availability state associated with a sidelink air interface resource, the first availability state being detected by the first UE; receiving, based at least in part on using the sidelink with the second UE, a second indication of a second availability state associated with the sidelink air interface resource, the second availability state not generated by the first UE; selecting a duplex communication configuration based at least in part on the first availability state and the second availability state; and communicating with the second UE using the sidelink and the sidelink air interface resource based at least in part on the duplex communication configuration.

Aspect 2: The method of Aspect 1, further comprising: sensing the first availability state associated with the sidelink air interface resource based at least in part on one or more sensing beams.

Aspect 3: The method of Aspect 2, wherein the one or more sensing beams comprise an omnidirectional beam, and wherein communicating with the second UE using the sidelink and the sidelink air interface resource comprises: communicating with the second UE based at least in part on a full-duplex (FD) beam pair.

Aspect 4: The method of Aspect 2, wherein the one or more sensing beams comprise at least a first full-duplex (FD) beam, and wherein communicating with the second UE using the sidelink comprises: communicating with the second UE based at least in part on at least a second FD beam.

Aspect 5: The method of Aspect 4, wherein the at least a first FD beam comprises at least one of: an FD transmit beam, or an FD receive beam.

Aspect 6: The method of Aspect 2, wherein the one or more sensing beams comprise a first full-duplex (FD) beam pair, and wherein communicating with the second UE using the sidelink comprises: communicating with the second UE based at least in part on using the FD beam pair.

Aspect 7: The method of Aspect 2, wherein the one or more sensing beams comprise a full-duplex (FD) beam pair, and the method further comprises: selecting the FD beam pair based at least in part on a self-interference metric associated with the FD beam pair.

Aspect 8: The method of Aspect 2, wherein the one or more sensing beams comprise a full-duplex (FD) beam pair, and wherein sensing the first availability state comprises: sensing the first availability state based at least in part on an FD transmit beam in the FD beam pair and an FD receive beam in the FD beam pair.

Aspect 9: The method of any of Aspects 1-8, wherein the first availability state indicates that the sidelink air interface resource is unoccupied, wherein the second availability state indicates that the sidelink air interface resource is unoccupied, and wherein selecting the duplex communication configuration comprises: selecting a full-duplex (FD) communication mode based at least in part on the first availability state indicating that the sidelink air interface resource is unoccupied and the second availability state indicating that the sidelink air interface resource is unoccupied Aspect 10: The method of any of Aspects 1-9, wherein the first availability state is different from the second availability state, and wherein selecting the duplex communication configuration comprises: selecting a half-duplex communication mode based at least in part on the first availability state being different from the second availability state.

Aspect 11: The method of any of Aspects 1-10, wherein transmitting the first indication of the first availability state comprises: transmitting the first indication in at least one of: a physical sidelink control channel (PSCCH), or a physical sidelink shared channel (PSSCH).

Aspect 12: The method of any of Aspects 1-11, wherein selecting the duplex communication configuration comprises selecting a full-duplex (FD) communication mode, and the method further comprises: selecting an FD beam pair that mitigates self-interference at the first UE, wherein communicating with the second UE using the sidelink and the sidelink air interface resource comprises: communicating with the second UE based at least in part on using the FD communication mode and the FD beam pair.

Aspect 13: The method of Aspect 12, wherein selecting the FD beam pair comprises: selecting the FD beam pair based at least in part on a self-interference metric associated with a fully-overlapping FD communication.

Aspect 14: The method of Aspect 12, further comprising: identifying the sidelink air interface resource as a common availability resource based at least in part on the first availability state and the second availability state indicating that the sidelink air interface resource is unoccupied, and wherein selecting the FD communication mode is based at least in part on identifying the sidelink air interface resource as the common availability resource.

Aspect 15: The method of Aspect 12, wherein the FD beam pair includes at least a first sub-band specific beam for FD transmission and a second sub-band specific beam for FD reception.

Aspect 16: The method of any of Aspects 1-15, further comprising: identifying the sidelink air interface resource as a non-common availability resource based at least in part on the first availability state and the second availability state, wherein selecting the duplex communication configuration comprises selecting a half-duplex (HD) communication mode, and wherein communicating with the second UE using the sidelink and the sidelink air interface resource comprises: communicating with the second UE based at least in part on using the HD communication mode and at least one HD beam.

Aspect 17: The method of Aspect 16, further comprising: sensing the first availability state based at least in part on using at least one of: an omnidirectional beam, or at least one FD beam included in an FD beam pair.

Aspect 18: The method of Aspect 16, wherein the sidelink air interface resource is one of multiple sidelink air interface resources, and the method further comprises: identifying, from the multiple sidelink air interface resources, a subset of sidelink air interface resources that are non-common availability resources, and wherein communicating with the second UE based at least in part on using the HD communication mode comprises: communicating with the second UE based at least in part on using the subset of sidelink air interface resources that are non-common availability resources, wherein the subset of sidelink air interface resources includes the sidelink air interface resource.

Aspect 19: The method of any of Aspects 1-18, wherein the sidelink air interface resource is one of multiple sidelink air interface resources, and the method further comprises: sensing a respective availability state of each sidelink air interface resource of the multiple sidelink air interface resources based at least in part on collective sensing that uses a full-duplex (FD) transmit beam and an FD receive beam, wherein the first availability state associated with the sidelink air interface resource is based at least in part on the collective sensing.

Aspect 20: The method of any of Aspects 1-19, further comprising: sensing the first availability state using at least one beam included in a full-duplex (FD) beam pair, the FD beam pair including an FD transmit beam and an FD receive beam; and identifying the sidelink air interface resource as a non-common availability resource, wherein selecting the duplex communication configuration comprises: selecting a half-duplex (HD) communication mode based at least in part on identifying the sidelink air interface resource as the non-common availability resource, and wherein communicating with the second UE using the sidelink and the sidelink air interface resource comprises: communicating with the second UE using at least one beam of the FD beam pair and the HD communication mode.

Aspect 21: The method of Aspect 20, wherein communicating with the second UE based at least in part on using the FD beam pair and the HD communication mode comprises at least one of: using the FD transmit beam as an HD receive beam; or using the FD receive beam as an HD transmit beam.

Aspect 22: The method of any of Aspects 1-21, wherein the sidelink air interface resource is one of multiple sidelink air interface resources, and the method further comprises: identifying the sidelink air interface resource as a non-common availability resource based at least in part on the first availability state and the second availability state; wherein the duplex communication configuration comprises a half-duplex (HD) communication mode, and wherein communicating with the second UE using the sidelink and the sidelink air interface resource comprises: communicating with the second UE based at least in part on using an HD beam and the HD communication mode.

Aspect 23: The method of Aspects 22, further comprising: sensing, using the HD beam and based at least in part on identifying the sidelink air interface resource as the non-common availability resource, a third availability state associated with the sidelink air interface resource.

Aspect 24: The method of Aspects 1-22, wherein the first availability state is an FD availability state, and the method further comprises: determining the FD availability state based at least in part on first resource sensing that uses an FD beam pair; and determining an HD availability state associated with the sidelink air interface resource based at least in part on second resource sensing that uses the HD beam.

Aspect 25: The method of Aspect 24, further comprising transmitting a third indication of the HD availability state.

Aspect 26: The method of any of Aspects 1-25, wherein the first availability state is a full-duplex (FD) availability state, and the method further comprises: determining, based at least in part on first resource sensing, the FD availability state; and determining, based at least in part on second resource sensing that is contemporaneous with the first resource sensing, a half-duplex (HD) availability state associated with the sidelink air interface resource, the second resource sensing being independent of the first resource sensing.

Aspect 27: The method of Aspect 26, wherein the first resource sensing is based at least in part on a first antenna panel, and wherein the second resource sensing is based at least in part on a second antenna panel.

Aspect 28: The method of Aspect 26, wherein the first resource sensing is based at least in part on an FD beam, and wherein the second resource sensing is based at least in part on an HD beam.

Aspect 29: The method of any of Aspects 1-28, wherein the sidelink air interface resource is one of multiple sidelink air interface resources, and the method further comprises: identifying, from the multiple sidelink air interface resources, a subset of sidelink air interface resources that are common availability resources; assigning a portion of the common availability resources to FD communications; and assigning at least one common availability resource of the subset of sidelink air interface resources to HD communications.

Aspect 30: A first user equipment (UE) for wireless communication, comprising: a memory; and one or more processors, coupled to the memory, configured to: transmit, based at least in part on using a sidelink with a second UE, a first indication of a first availability state associated with a sidelink air interface resource, the first availability state being detected by the first UE; receive, based at least in part on using the sidelink with the second UE, a second indication of a second availability state associated with the sidelink air interface resource, the second availability state not generated by the first UE; select a duplex communication configuration based at least in part on the first availability state and the second availability state; and communicate with the second UE using the sidelink and the sidelink air interface resource based at least in part on the duplex communication configuration.

Aspect 31: A non-transitory computer-readable medium storing a set of instructions for wireless communication, the set of instructions comprising: one or more instructions that, when executed by one or more processors of a first user equipment (UE), cause the UE to: transmit, based at least in part on using a sidelink with a second UE, a first indication of a first availability state associated with a sidelink air interface resource, the first availability state being detected by the first UE; receive, based at least in part on using the sidelink with the second UE, a second indication of a second availability state associated with the sidelink air interface resource, the second availability state not generated by the first UE; select a duplex communication configuration based at least in part on the first availability state and the second availability state; and communicate with the second UE using the sidelink and the sidelink air interface resource based at least in part on the duplex communication configuration.

Aspect 32: An apparatus for wireless communication, comprising: means for transmitting, based at least in part on using a sidelink with a second UE, a first indication of a first availability state associated with a sidelink air interface resource, the first availability state being detected by the first UE; means for receiving, based at least in part on using the sidelink with the second UE, a second indication of a second availability state associated with the sidelink air interface resource, the second availability state not generated by the first UE; means for selecting a duplex communication configuration based at least in part on the first availability state and the second availability state; and means for communicating with the second UE using the sidelink and the sidelink air interface resource based at least in part on the duplex communication configuration.

Aspect 33: A system configured to perform one or more operations recited in one or more of Aspects 1-32.

Aspect 33: An apparatus comprising means for performing one or more operations recited in one or more of Aspects 1-32.

Aspect 34: A non-transitory computer-readable medium storing a set of instructions, the set of instructions comprising one or more instructions that, when executed by a device, cause the device to perform one or more operations recited in one or more of Aspects 1-32.

Aspect 35: A computer program product comprising instructions or code for executing one or more operations recited in one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
 a memory; and
 one or more processors, coupled to the memory, configured to:
  transmit, based at least in part on using a sidelink with a second UE, a first indication of a first availability state associated with a sidelink air interface resource and is detected by the first UE;
  receive, based at least in part on using the sidelink with the second UE, a second indication of a second availability state associated with the sidelink air interface resource, the second availability state not generated by the first UE;

select a duplex communication configuration based at least in part on the first availability state and the second availability state; and
communicate with the second UE using the sidelink and the sidelink air interface resource based at least in part on the duplex communication configuration.

2. The apparatus of claim 1, wherein the one or more processors are further configured to:
sense the first availability state associated with the sidelink air interface resource based at least in part on one or more sensing beams.

3. The apparatus of claim 2, wherein the one or more sensing beams comprise an omnidirectional beam, and
wherein the one or more processors, to communicate with the second UE using the sidelink and the sidelink air interface resource, are configured to:
communicate with the second UE based at least in part on a full-duplex (FD) beam pair.

4. The apparatus of claim 2, wherein the one or more sensing beams comprise at least one beam included in a full-duplex (FD) beam pair, and
wherein the one or more processors, to communicate with the second UE using the sidelink, are configured to:
communicate with the second UE based at least in part on using the FD beam pair.

5. The apparatus of claim 2, wherein the one or more sensing beams comprise a full-duplex (FD) beam pair, and
wherein the one or more processors, to sense the first availability state, are configured to:
sense the first availability state based at least in part on an FD transmit beam in the FD beam pair and an FD receive beam in the FD beam pair.

6. The apparatus of claim 1, wherein the first availability state indicates that the sidelink air interface resource is unoccupied,
wherein the second availability state indicates that the sidelink air interface resource is unoccupied, and
wherein the one or more processors, to select the duplex communication configuration, are configured to:
select a full-duplex (FD) communication mode based at least in part on the first availability state indicating that the sidelink air interface resource is unoccupied and the second availability state indicating that the sidelink air interface resource is unoccupied.

7. The apparatus of claim 1, wherein the first availability state is different from the second availability state, and
wherein the one or more processors, to select the duplex communication configuration, are configured to:
select a half-duplex (HD) communication mode based at least in part on the first availability state being different from the second availability state.

8. The apparatus of claim 1, wherein the one or more processors are further configured to:
identify the sidelink air interface resource as a non-common availability resource based at least in part on the first availability state and the second availability state,
wherein the one or more processors, to select the duplex communication configuration, are configured to select a half-duplex (HD) communication mode, and
wherein the one or more processors, to communicate with the second UE using the sidelink and the sidelink air interface resource, are configured to:
communicate with the second UE based at least in part on using the HD communication mode and at least one HD beam.

9. The apparatus of claim 8, wherein the one or more processors are further configured to:
sense the first availability state based at least in part on using at least one of:
an omnidirectional beam, or
at least one FD beam included in an FD beam pair.

10. The apparatus of claim 8, wherein the sidelink air interface resource is one of multiple sidelink air interface resources, and wherein the one or more processors are further configured to:
identify, from the multiple sidelink air interface resources, a subset of sidelink air interface resources that are non-common availability resources, and
wherein the one or more processors, to communicate with the second UE based at least in part on using the HD communication mode, are configured to:
communicate with the second UE based at least in part on using the subset of sidelink air interface resources that are non-common availability resources, wherein the subset of sidelink air interface resources includes the sidelink air interface resource.

11. The apparatus of claim 1, wherein the sidelink air interface resource is one of multiple sidelink air interface resources, and wherein the one or more processors are further configured to:
sense a respective availability state of each sidelink air interface resource of the multiple sidelink air interface resources based at least in part on collective sensing that uses a full-duplex (FD) transmit beam and an FD receive beam,
wherein the first availability state associated with the sidelink air interface resource is based at least in part on the collective sensing.

12. The apparatus of claim 1, wherein the one or more processors are further configured to:
sense the first availability state based at least in part on using at least one beam included in a full-duplex (FD) beam pair, the FD beam pair including an FD transmit beam and an FD receive beam; and
identify the sidelink air interface resource as a non-common availability resource,
wherein the one or more processors, to select the duplex communication configuration, are configured to:
select a half-duplex (HD) communication mode based at least in part on identifying the sidelink air interface resource as the non-common availability resource, and
wherein the one or more processors, to communicate with the second UE using the sidelink and the sidelink air interface resource, are configured to:
communicate with the second UE using at least one beam of the FD beam pair and the HD communication mode.

13. The apparatus of claim 1, wherein the first availability state is an FD availability state, and wherein the one or more processors are further configured to:
determine the FD availability state based at least in part on first resource sensing that uses an FD beam pair; and
determine an HD availability state associated with the sidelink air interface resource based at least in part on second resource sensing that uses a half-duplex (HD) beam.

14. The apparatus of claim 13, wherein the one or more processors are further configured to:
perform the first resource sensing contemporaneously with the second resource sensing, the second resource sensing being independent of the first resource sensing.

15. A method of wireless communication performed by a first user equipment (UE), comprising:
- transmitting, based at least in part on using a sidelink with a second UE, a first indication of a first availability state that is associated with a sidelink air interface resource and is detected by the first UE;
- receiving, based at least in part on using the sidelink with the second UE, a second indication of a second availability state associated with the sidelink air interface resource, the second availability state not generated by the first UE;
- selecting a duplex communication configuration based at least in part on the first availability state and the second availability state; and
- communicating with the second UE using the sidelink and the sidelink air interface resource based at least in part on the duplex communication configuration.

16. The method of claim 15, further comprising:
- sensing the first availability state associated with the sidelink air interface resource based at least in part on one or more sensing beams.

17. The method of claim 16, wherein the one or more sensing beams comprise an omnidirectional beam, and
- wherein communicating with the second UE using the sidelink and the sidelink air interface resource comprises:
  - communicating with the second UE based at least in part on a full-duplex (FD) beam pair.

18. The method of claim 16, wherein the one or more sensing beams comprise at least one beam included in a full-duplex (FD) beam pair, and
- wherein communicating with the second UE using the sidelink comprises:
  - communicating with the second UE based at least in part on using the FD beam pair.

19. The method of claim 16, wherein the one or more sensing beams comprise a full-duplex (FD) beam pair, and
- wherein sensing the first availability state comprises:
  - sensing the first availability state based at least in part on an FD transmit beam in the FD beam pair and an FD receive beam in the FD beam pair.

20. The method of claim 15, wherein the first availability state indicates that the sidelink air interface resource is unoccupied,
- wherein the second availability state indicates that the sidelink air interface resource is unoccupied, and
- wherein selecting the duplex communication configuration comprises:
  - selecting a full-duplex (FD) communication mode based at least in part on the first availability state indicating that the sidelink air interface resource is unoccupied and the second availability state indicating that the sidelink air interface resource is unoccupied.

21. The method of claim 15, wherein the first availability state is different from the second availability state, and
- wherein selecting the duplex communication configuration comprises:
  - selecting a half-duplex (HD) communication mode based at least in part on the first availability state being different from the second availability state.

22. The method of claim 15, further comprising:
- identifying the sidelink air interface resource as a non-common availability resource based at least in part on the first availability state and the second availability state,
- wherein selecting the duplex communication configuration comprises selecting a half-duplex (HD) communication mode, and
- wherein communicating with the second UE using the sidelink and the sidelink air interface resource comprises:
  - communicating with the second UE based at least in part on using the HD communication mode and at least one HD beam.

23. The method of claim 22, further comprising:
- sensing the first availability state based at least in part on using at least one of:
  - an omnidirectional beam, or
  - at least one FD beam included in an FD beam pair.

24. The method of claim 22, wherein the sidelink air interface resource is one of multiple sidelink air interface resources, and the method further comprises:
- identifying, from the multiple sidelink air interface resources, a subset of sidelink air interface resources that are non-common availability resources, and
- wherein communicating with the second UE based at least in part on using the HD communication mode comprises:
  - communicating with the second UE based at least in part on using the subset of sidelink air interface resources that are non-common availability resources, wherein the subset of sidelink air interface resources includes the sidelink air interface resource.

25. The method of claim 15, wherein the sidelink air interface resource is one of multiple sidelink air interface resources, and the method further comprises:
- sensing a respective availability state of each sidelink air interface resource of the multiple sidelink air interface resources based at least in part on collective sensing that uses a full-duplex (FD) transmit beam and an FD receive beam,
- wherein the first availability state associated with the sidelink air interface resource is based at least in part on the collective sensing.

26. The method of claim 15, further comprising:
- sensing the first availability state using at least a one beam included in a full-duplex (FD) beam pair, the FD beam pair including an FD transmit beam and an FD receive beam; and
- identifying the sidelink air interface resource as a non-common availability resource,
- wherein selecting the duplex communication configuration comprises:
  - selecting a half-duplex (HD) communication mode based at least in part on identifying the sidelink air interface resource as the non-common availability resource, and
- wherein communicating with the second UE using the sidelink and the sidelink air interface resource comprises:
  - communicating with the second UE using at least one beam of the FD beam pair and the HD communication mode.

27. The method of claim 15, wherein the first availability state is an FD availability state, and the method further comprises:
- determining the FD availability state based at least in part on first resource sensing that uses an FD beam pair; and
- determining an HD availability state associated with the sidelink air interface resource based at least in part on second resource sensing that uses a half-duplex (HD) beam.

28. The method of claim 15, wherein the sidelink air interface resource is one of multiple sidelink air interface resources, and the method further comprises:
- identifying, from the multiple sidelink air interface resources, a subset of sidelink air interface resources that are common availability resources;
- assigning a portion of the common availability resources to FD communications; and
- assigning at least one common availability resource of the subset of sidelink air interface resources to HD communications.

29. A non-transitory computer-readable medium storing a set of instructions for wireless communication, the set of instructions comprising:
- one or more instructions that, when executed by one or more processors of a first user equipment (UE), cause the first UE to:
  - transmit, based at least in part on using a sidelink with a second UE, a first indication of a first availability state that is associated with a sidelink air interface resource and is detected by the first UE;
  - receive, based at least in part on using the sidelink with the second UE, a second indication of a second availability state associated with the sidelink air interface resource, the second availability state not generated by the first UE;
  - select a duplex communication configuration based at least in part on the first availability state and the second availability state; and
  - communicate with the second UE using the sidelink and the sidelink air interface resource based at least in part on the duplex communication configuration.

30. An apparatus for wireless communication, comprising:
- means for transmitting, based at least in part on using a sidelink with a second UE, a first indication of a first availability state that is associated with a sidelink air interface resource and is detected by the apparatus;
- means for receiving, based at least in part on using the sidelink with a second apparatus, a second indication of a second availability state associated with the sidelink air interface resource, the second availability state not generated by the apparatus;
- means for selecting a duplex communication configuration based at least in part on the first availability state and the second availability state; and
- means for communicating with the second apparatus using the sidelink and the sidelink air interface resource based at least in part on the duplex communication configuration.

* * * * *